(12) United States Patent
Kuroiwa et al.

(10) Patent No.: US 12,456,781 B2
(45) Date of Patent: Oct. 28, 2025

(54) SEPARATOR FOR ALKALINE BATTERIES, AND ALKALINE BATTERY

(71) Applicant: NIPPON KODOSHI CORPORATION, Kochi (JP)

(72) Inventors: Masahiro Kuroiwa, Kochi (JP); Kenta Morimoto, Kochi (JP); Norihiro Wada, Kochi (JP); Naoya Kawazawa, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 749 days.

(21) Appl. No.: 17/440,055

(22) PCT Filed: Feb. 7, 2020

(86) PCT No.: PCT/JP2020/004936
§ 371 (c)(1),
(2) Date: Sep. 16, 2021

(87) PCT Pub. No.: WO2020/195238
PCT Pub. Date: Oct. 1, 2020

(65) Prior Publication Data
US 2022/0190443 A1     Jun. 16, 2022

(30) Foreign Application Priority Data
Mar. 22, 2019   (JP) .............................. 2019-054784

(51) Int. Cl.
*H01M 50/457* (2021.01)
*H01M 50/409* (2021.01)
(Continued)

(52) U.S. Cl.
CPC ....... *H01M 50/457* (2021.01); *H01M 50/409* (2021.01); *H01M 50/44* (2021.01); *H01M 50/489* (2021.01); *H01M 2300/0014* (2013.01)

(58) Field of Classification Search
CPC .. H01M 50/457; H01M 50/409; H01M 50/44; H01M 50/489; H01M 2300/0014
See application file for complete search history.

(56) References Cited

U.S. PATENT DOCUMENTS 3,951,687 A * 4/1976 Takamura ............. H01M 4/244
429/219
6,379,836 B1 * 4/2002 Kubo .................... H01M 50/44
429/247
(Continued)

FOREIGN PATENT DOCUMENTS

JP    H02-119049 A   5/1990
JP    H10-092411 A   4/1998
(Continued)

OTHER PUBLICATIONS

Apr. 21, 2020 Search Report issued in International Patent Application No. PCT/JP2020/004936.
(Continued)

*Primary Examiner* — Matthew T Martin
*Assistant Examiner* — Bartholomew A Hornsby
(74) *Attorney, Agent, or Firm* — Oliff PLC

(57) ABSTRACT

A separator for alkaline batteries, which exhibits excellent strength, dimensional stability and chemical stability in an electrolyte solution, while having high shielding properties, high liquid holding properties and low resistance. A separator for alkaline batteries, which is used for the purpose of separating a positive electrode active material and a negative electrode active material from each other, and holding an electrolyte solution, and which is obtained by stacking and integrating a fiber layer A that has a density of 0.52-0.62 g/cm$^3$ and a thickness of 25-35 μm and a fiber layer B that has a density of 0.40-0.50 g/cm$^3$ and a thickness of 25-35
(Continued)

μm, so that the entirety of the separator has a density of 0.45-0.57 g/cm³ and a thickness of 50-70 μm.

5 Claims, 2 Drawing Sheets

(51) Int. Cl.
*H01M 50/44* (2021.01)
*H01M 50/489* (2021.01)

(56) References Cited

U.S. PATENT DOCUMENTS

| | | | | |
|---|---|---|---|---|
| 7,781,104 B2 * | 8/2010 | Kubo | ............... | H01M 50/489 |
| | | | | 429/255 |
| 2006/0014080 A1 | 1/2006 | Kubo et al. | | |
| 2010/0119930 A1 * | 5/2010 | Anglin | ............... | H01M 50/4295 |
| | | | | 429/144 |
| 2013/0149614 A1 * | 6/2013 | Kubo | ............... | H01M 50/4295 |
| | | | | 162/146 |
| 2013/0183569 A1 * | 7/2013 | Hayakawa | ........... | H01M 50/491 |
| | | | | 429/144 |
| 2015/0010828 A1 * | 1/2015 | Kubo | ............... | H01M 50/44 |
| | | | | 429/246 |
| 2017/0133165 A1 * | 5/2017 | Ichimura | ............... | H01M 50/44 |
| 2018/0358595 A1 | 12/2018 | Kuroiwa et al. | | |

FOREIGN PATENT DOCUMENTS

| | | | |
|---|---|---|---|
| JP | H11-260337 A | | 9/1999 |
| JP | 2001-283818 A | | 10/2001 |
| JP | 2006-4732 A | | 1/2006 |
| JP | 2006-004844 A | | 1/2006 |
| JP | 2006004732 A | * | 1/2006 |
| JP | 2007-227067 A | | 9/2007 |
| JP | 2012-054228 A | | 3/2012 |
| JP | 2014123443 | * | 7/2014 |
| JP | 2015-088703 A | | 5/2015 |
| JP | 2016-025211 A | | 2/2016 |
| JP | 2016-129094 A | | 7/2016 |
| JP | 2016-170974 A | | 9/2016 |
| WO | 2017/104336 A1 | | 6/2017 |

OTHER PUBLICATIONS

Jul. 31, 2023 Extended European Search Report issued in European Patent Application No. 20778882.9.

* cited by examiner

SEPARATOR FOR ALKALINE BATTERIES, AND ALKALINE BATTERY

TECHNICAL FIELD

The present invention relates to a separator for alkaline batteries, which is used for an alkaline battery using zinc as a negative electrode active material, such as an alkaline manganese battery, a nickel zinc battery, a silver oxide battery, or a zinc-air battery. The present invention also relates to an alkaline battery including the separator for alkaline batteries, and particularly relates to a small-sized alkaline battery having an AA shape or an AAA shape.

BACKGROUND ART

In an alkaline battery, a positive electrode active material and a negative electrode active material are separated from each other by a separator.

Characteristics required for a separator for alkaline batteries include shielding properties, electrolyte solution holding properties, chemical stability, and properties that do not obstruct ion conduction.

The shielding properties means performance of preventing short circuit failure due to needle-like crystals (dendrites) of zinc oxide generated by contact between the positive electrode active material and the negative electrode active material or discharge of a negative electrode.

The holding properties of an electrolyte solution (that is, liquid holding properties) means characteristics of holding an electrolyte solution such as potassium hydroxide for causing the electromotive reaction of the alkaline battery.

Specifically, the chemical stability does not cause shrinkage and alteration with respect to the electrolyte solution of the alkaline battery.

Impact during transportation or dropping of the alkaline battery also may damage the separator inside the battery, which causes an internal short circuit to occur, whereby the separator is required to maintain sufficient mechanical strength.

As such a separator for alkaline batteries, a mixed paper of a synthetic fiber and a cellulose fiber is used. This mixed paper is mainly formed of a vinylon fiber or a nylon fiber which is an alkali-resistant synthetic fiber, and is prepared by blending a rayon fiber which is a highly alkali-resistant cellulose fiber, dissolving pulp, cotton linter pulp, mercerized wood pulp, a polynosic fiber, or a lyocell fiber or the like to the vinylon or nylon fiber and further adding, as a binder, a polyvinyl alcohol fiber which is highly soluble in hot water of 60° C. to 90° C.

In manufacturing these separators of the related art, the cellulose fiber described above is subjected to a beating process as necessary to generate fine fibrils from the fiber body, thereby improving the denseness of the separators and enhancing the shielding performance of the separators.

As the alkaline battery is increasingly used in a digital camera, a game machine, a remote controller, a radio-controlled car, and a battery-type charger for mobile phones, and the like, and as the performance of these apparatuses advances, the alkaline battery is required to achieve a higher current, and heavy load discharge characteristics are considered to be important. Intermittent discharge characteristics which are characteristics close to actual use tend to be considered to be also important.

In order to improve these discharge characteristics of the alkaline battery, it is important that the internal resistance value of the battery is decreased. When the internal resistance value is large, the voltage drop of the battery occurs due to this resistance, and the discharge capacity of the battery is also decreased. For this reason, for the purpose of improving the discharge characteristics of the battery, there is an increasing demand for decreasing the resistance of the separator.

Furthermore, in recent years, the storage of batteries has been recommended in manufacture for disasters, and accordingly, alkaline batteries that can be stored for 10 years or more have been required. For this reason, there is also an increasing demand for improvement in the liquid holding properties and long-term chemical stability of the separator.

It is effective to decrease the thickness of the separator in order to decrease the resistance of the separator. However, when the thickness of the separator is decreased, the strength of the separator is decreased, and the shielding properties and liquid holding properties of the separators are simultaneously deteriorated. For this reason, when a thin separator is used, the discharge characteristics and storage characteristics of the battery are deteriorated due to an increase in the short circuit failure of the alkaline battery and deterioration in the liquid holding properties during use, manufacture, and transportation and the like.

In order to reduce the short circuit failure of the alkaline battery, it is effective to enhance the shielding properties of the separator.

In order to enhance the shielding properties of the separator, it is effective to increase the degree of beating of the cellulose fiber when the cellulose fiber is blended as a constituent material, and it is effective to blend a synthetic fiber having a small fiber diameter when the synthetic fiber is blended as a constituent material.

In order to improve the storage characteristics of the alkaline battery, improvement in the liquid holding properties of the separator can be mentioned as means.

In order to enhance the liquid holding properties of the separator, it is effective to reduce the density of the separator, but it is contradictory to the means for enhancing the shielding properties described above.

In order to achieve high shielding properties and liquid holding properties, a separator having a low density and a large thickness can also be used, but the occupied volume of the separator in a battery case is increased, which causes a decreased amount of the electrode active material inserted into the battery, whereby the discharge capacity of the battery is decreased. Therefore, as the separator, a thin separator having high shielding properties and liquid holding properties is required.

As described above, a separator having a small thickness and excellent shielding properties and liquid holding properties is required as the separator for alkaline batteries. However, the decrease in the thickness of the separator is incompatible to shielding properties and liquid holding properties thereof, which makes it difficult to simultaneously improve all of these characteristics.

Conventionally, various configurations have been proposed for the purpose of improving characteristics in the separator for alkaline batteries (see, for example, Patent Literatures 1 to 6).

CITATION LIST

Patent Literature

Patent Literature 1: JP 02-119049 A
Patent Literature 2: JP 2012-54228 A
Patent Literature 3: JP 2006-4844 A Patent Literature 4: JP 11-260337 A
Patent Literature 5: JP 10-92411 A
Patent Literature 6: WO 2017/104336 A

SUMMARY OF INVENTION

Technical Problem

To a separator proposed in Patent Literature 1, 10% by mass to 20% by mass of a highly soluble polyvinyl alcohol fiber that is dissolved in hot water at 60° C. to 90° C. is added. This highly soluble polyvinyl alcohol fiber is mixed with other raw material fiber, and formed into a wet paper web. The highly soluble polyvinyl alcohol fiber is dissolved in water (hot water) in the wet paper web by heating in the drying step of the wet paper web, and the polyvinyl alcohol resin melts and spreads between a cellulose fiber and a synthetic fiber that constitute the wet paper web. Then, as drying proceeds, moisture evaporates from the wet paper web, and the polyvinyl alcohol resin that has spread between the fibers bonds the intersections between the fibers. As a result, the strength of the sheet is increased. Since the polyvinyl alcohol resin is hardly dissolved in the alkaline electrolyte solution, the high strength of the separator is also held in the electrolyte solution.

However, the polyvinyl alcohol resin that has been dissolved in the drying step spreads between the fibers and takes a film form. The film-form resin that bonds the fibers clogs pores in the separator. For this reason, the permeation of ions through the separator is blocked, which causes an increased resistance value. Since the separator has fewer voids, the liquid absorption properties and liquid holding properties of the separator are also deteriorated.

Here, when the degree of beating of a cellulose fiber is decreased in order to decrease the resistance value of the separator, the shielding properties of the separator are also deteriorated, and the short circuit failure is increased.

Patent Literature 2 proposes a separator whose strength in an electrolyte solution is increased by adding a polyamine epichlorohydrin resin to a slurry liquid containing cellulose fibers to crosslink the cellulose fibers.

This separator has excellent strength in an alkaline electrolyte solution, and is not broken even when impact is applied to the battery, such as when the battery is dropped.

Since this separator has excellent strength in the electrolyte solution, the amount of the polyamine epichlorohydrin resin added is reduced to suppress a hydrogen gas generation amount, but the hydrogen gas generation amount tends to be larger than that of a separator to which the polyamine epichlorohydrin resin is not added. Therefore, it has been found that the pressure inside the battery may be apt to be increased, which is apt to cause liquid leakage to occur.

Furthermore, in the paper industry, sheets are generally recycled, but the fibers are crosslinked by the polyamine epichlorohydrin resin, which makes it difficult to re-disperse the constituent fibers. This disadvantageously causes difficult recycling of the sheet.

Patent Literature 3 proposes a cellulose separator formed of crystal structures of cellulose I and cellulose II that have been highly beaten. Since the cellulose fiber is highly beaten, a dense sheet is formed, whereby a separator having high shielding properties can be achieved.

However, since this separator is composed only of the cellulose fiber, the strength of the separator in the alkaline electrolyte solution is not sufficient. When the battery is prepared and then impact such as dropping is applied to the battery, the separator may be broken inside the battery, which causes short circuit failure.

The highly beaten cellulose fiber has very good water holding properties, and the amount of held water during papermaking is also large. For this reason, if a binder component such as a polyvinyl alcohol fiber is added to increase the strength in the electrolyte solution, the polyvinyl alcohol resin that has been dissolved in the drying step takes a film form and bonds between the cellulose fibers, which makes it difficult to decrease the resistance value of the separator. Accordingly, the recent demand for further decreasing the resistance cannot be sufficiently met.

Patent Literature 4 proposes an example of using cellophane as a separator. Cellophane is obtained by dissolving natural cellulose such as pulp in a solvent and then performing precipitation therein to form a film-shaped sheet.

Therefore, although a separator having excellent shielding properties is obtained, the separator does not satisfactorily hold the electrolyte solution. As described in Patent Literature 4, the separator is generally bonded to a separator composed of a nonwoven fabric and used.

For this reason, a step of bonding is required, which is inefficient, and the separator is more expensive than a general separator.

Patent Literature 5 proposes a separator obtained by integrally stacking a dense layer having denseness and a liquid holding layer having liquid holding properties. The dense layer and the liquid holding layer are each formed by mixing an alkali-resistant cellulose fiber, an alkali-resistant synthetic fiber, and a polyvinyl alcohol fiber. In each layer, the polyvinyl alcohol fiber is used as a binder.

The separator includes the dense layer and the liquid holding layer, whereby the separator has high shielding properties and improved liquid holding properties, but in the polyvinyl alcohol fiber used as the binder, as with Patent Literature 1, the polyvinyl alcohol resin dissolved in the drying step spreads between the fibers and takes a film form. The film-form resin that bonds the fibers clogs pores in the separator, whereby the permeation of ions through the separator is inhibited, which causes an increased resistance value. This phenomenon is more conspicuous as a layer having a binder is denser, which may cause deteriorated resistance, particularly, in the dense layer.

Here, when the degree of beating of a cellulose fiber is decreased in order to decrease the resistance value of the separator, the shielding properties of the separator are also deteriorated, and the short circuit failure is increased.

Furthermore, each layer contains the synthetic fiber, which makes it possible to prevent the curl, but when a difference in density between the dense layer and the liquid holding layer is large, a change in humidity may cause a difference of expansion and contraction during moisture absorption or moisture release in each layer, which causes the curl to occur. Processability during the manufacture of the battery may be poor.

Patent Literature 6 proposes a separator including a substrate layer composed only of an alkali-resistant fiber containing alkali-resistant cellulose and an alkali-resistant resin layer containing an alkali-resistant resin. When the alkali-resistant resin is applied to the separator, the alkali-resistant resin does not penetrate into gaps between individual fibers, whereby an alkali-resistant resin layer is relatively formed in a surface layer to bond the fibers.

The separator includes the substrate layer and the alkali-resistant resin layer, whereby the separator having high shielding properties and high strength of the separator in the electrolyte solution can be achieved. As described above, the separator including the alkali-resistant resin such as polyvinyl alcohol is generally a separator having a high resistance value, but the separator contains a polycarboxylic acid as an additive, whereby the separator has high hydrophilicity, and has high liquid holding properties of the alkaline electrolyte solution. The separator has high hydrophilicity, and even when the separator contains an alkali-resistant resin, a decrease in ion permeability hardly occurs, whereby an increase in the resistance value of the separator is suppressed. However, the polycarboxylic acid and salts thereof swell in the electrolyte solution, whereby if the polycarboxylic acid and salts thereof cannot be homogeneously mixed with the alkali-resistant resin and applied as the alkali-resistant resin layer, a portion in which binding between fibers is insufficient locally occurs. From the viewpoint of long-term stability, a decrease in partial strength of the separator may occur.

The substrate layer can be composed of two layers, but when the difference in density between the two substrate layers is large, the curl may occur as with the separator of Patent Literature 5, and processability during the manufacture of the battery may be poor.

The present invention has been made in view of the above problems, and an object of the present invention is to provide a separator for alkaline batteries, which exhibits excellent electrolyte solution holding properties and shielding properties, and has low resistance. Another object of the present invention is to allow the use of the separator to provide the high capacity, high current, and long life of an alkaline battery.

Solution to Problem

The present invention has been made to solve the above-described problems and achieve the above-described objects, and includes, for example, the following configurations as means for achieving the objects.

That is, a separator for alkaline batteries of the present invention is a separator for alkaline batteries, which is used for the purpose of separating a positive electrode active material and a negative electrode active material from each other, and holding an electrolyte solution, and which is obtained by integrally stacking a fiber layer A that has a density of 0.52 to 0.62 g/cm$^3$ and a thickness of 25 to 35 μm and a fiber layer B that has a density of 0.40 to 0.50 g/cm$^3$ and a thickness of 25 to 35 μm, so that the entirety of the separator has a density of 0.45 to 0.57 g/cm$^3$ and a thickness of 50 to 70 μm.

In the separator for alkaline batteries of the present invention, the fiber layer A and the fiber layer B may contain 60 to 90% by mass of an alkali-resistant cellulose fiber and 10 to 40% by mass of an alkali-resistant synthetic fiber.

In the separator for alkaline batteries of the present invention, the fiber layer A may contain an alkali-resistant cellulose fiber having a CSF value of 200 to 0 ml, and the fiber layer B may contain an alkali-resistant cellulose fiber having a CSF value of 700 to 500 ml.

Furthermore, the alkali-resistant synthetic fiber may contain one or more fibers selected from a vinylon fiber, a polypropylene fiber, and a polyamide fiber.

In the separator for alkaline batteries of the present invention, the fiber layer B may contain a polyvinyl alcohol resin.

Furthermore, an amount of the polyvinyl alcohol resin contained in the fiber layer B may be 0.3 to 1.5 g/m$^2$.

An alkaline battery of the present invention is an alkaline battery in which a positive electrode active material and a negative electrode active material are separated from each other by a separator, wherein the separator for alkaline batteries of the present invention is used as the separator. The alkaline battery may have an AA shape or an AAA shape.

The alkaline battery of the present invention is preferably an alkaline manganese battery, a nickel zinc battery, a silver oxide battery, or an air-zinc battery.

Advantageous Effects of Invention

The present invention makes it possible to provide a separator for alkaline batteries, which exhibits excellent strength, dimensional stability and chemical stability in an electrolyte solution, while having high shielding properties, high liquid holding properties and low resistance, and an alkaline battery including the separator.

DESCRIPTION OF EMBODIMENTS

Figure 1:
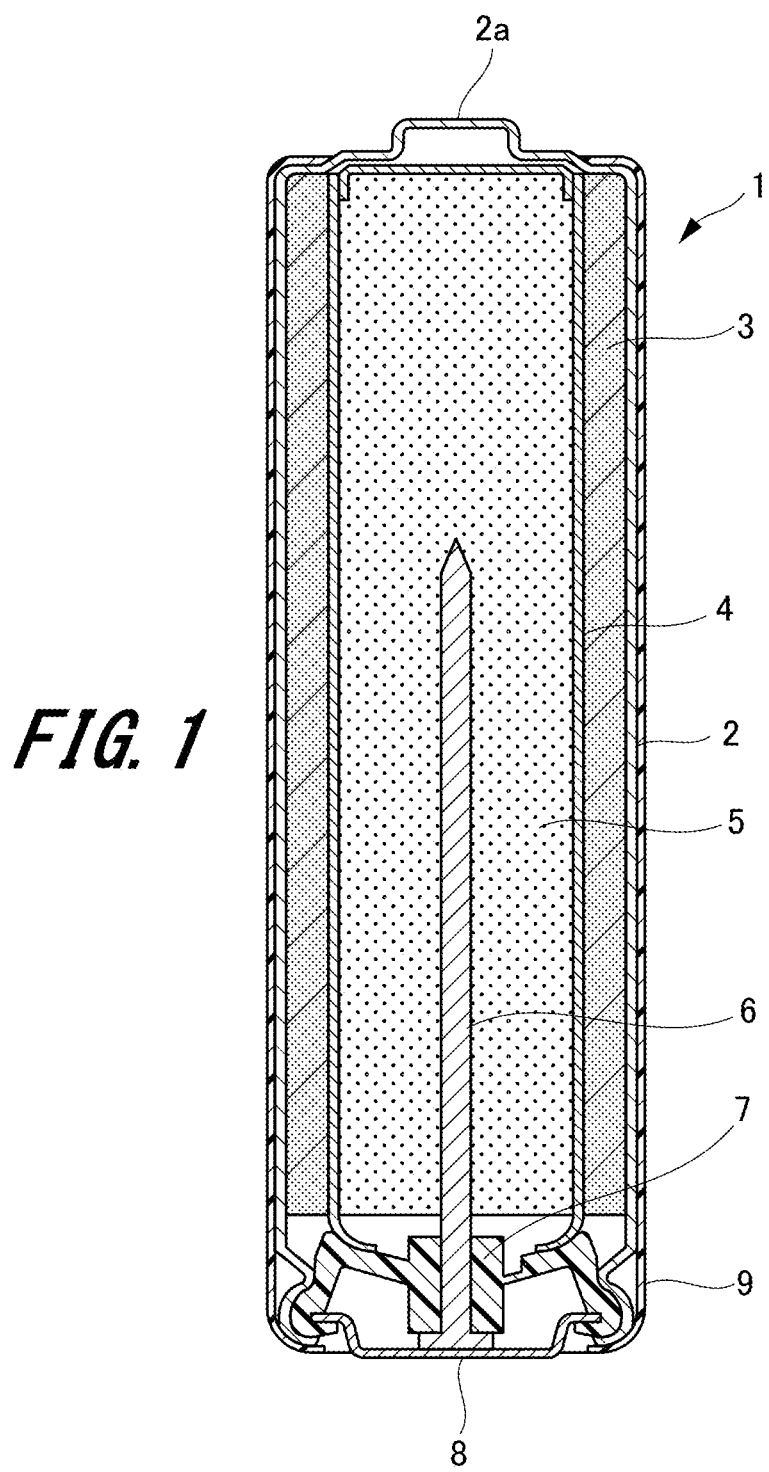
FIG. 1 is a schematic configuration view (cross-sectional view) of an alkaline manganese battery prepared by using a separator of each of Examples, Comparative Examples, Reference Examples, and Conventional Examples of the present invention.

The present invention has been made to solve the above-described problems and achieve the above-described objects, and includes, for example, the following configurations as means for achieving the objects.

A separator for alkaline batteries of the present invention is used for the purpose of separating a positive electrode active material and a negative electrode active material from each other in an alkaline battery, and holding an electrolyte solution.

The separator for alkaline batteries of the present invention is obtained by integrally stacking a fiber layer A that has a density of 0.52 to 0.62 g/cm$^3$ and a thickness of 25 to 35 μm and a fiber layer B that has a density of 0.40 to 0.50 g/cm$^3$ and a thickness of 25 to 35 μm, so that the entirety of the separator has a density of 0.45 to 0.57 g/cm$^3$ and a thickness of 50 to 70 μm.

In the separator for alkaline batteries of the present invention, preferably, the fiber layer A and the fiber layer B contain 60 to 90% by mass of an alkali-resistant cellulose fiber and 10 to 40% by mass of an alkali-resistant synthetic fiber.

The alkali-resistant cellulose fiber that can be used in the present invention is preferably dissolving pulp or mercerized pulp.

The alkali-resistant cellulose fiber slightly shrinks or decomposes even when immersed in an alkaline electrolyte solution. For this reason, when the separator is used as the separator for alkaline batteries, the separator has excellent dimensional stability and chemical stability.

When the fiber layer A and the fiber layer B of the separator do not contain the alkali-resistant cellulose fiber, the dimensional stability and chemical stability of the separator cannot be improved.

When the dimensional stability is poor, the separator shrinks in the electrolyte solution. In the manufacturing process of the battery, the positive electrode active material and the cylindrically molded separator are loaded in this order, and the electrolyte solution is injected before the negative electrode active material is loaded. At this time, the separator shrinks due to the alkaline electrolyte solution, whereby the size of the molded cylinder may be decreased, or wrinkles may occur in the lower part of the cylinder. When attempting to load a prescribed amount of the negative electrode active material, the negative electrode active material may overflow from the upper part of the separator, or the sealing due to the separator may be insufficient. As a result, the discharge capacity of the battery is decreased, or the active material overflow causes occurrence of short circuit failure.

When the chemical stability is low, the separator is decomposed by the electrolyte solution, which may cause short circuit failure, or the internal pressure of the battery is increased due to a gas generated by the decomposition, which may cause liquid leakage.

Pulp is obtained by adding an alkaline chemical to wood chips and the like that serve as pulp raw materials, and processing the raw materials at high temperature and high pressure (pulping) to remove binding substances such as lignin and hemicellulose. The resulting pulp is immersed in an aqueous sodium hydroxide solution having a high concentration of about 17% by mass to obtain mercerized pulp.

Meanwhile, the manufacturing method and processes of the dissolving pulp are different from those of general papermaking pulp prepared by adding an alkaline chemical to chips of wood or the like and performing pulping. To make the dissolving pulp, before pulping, wood or non-wood chips are subjected to a steaming treatment at high temperature in an acidic environment of pH 2 to 3 to hydrolyze the binding substances contained in the chips. After the steaming treatment, pulping is performed to obtain pulp. The pulped pulp is further treated with an aqueous alkaline solution such as sodium hydroxide, at about 2 to 10% by mass to extract and remove the binding substances.

During pulping, the chips of wood or the like are treated in an acidic environment so that the binding substances interlaced between the cellulose chains are hydrolyzed into lower-molecular-weight substances. For this reason, the binding substances are easily extracted and removed by the aqueous alkaline solution after pulp formation.

The pulping method for these types of pulp to be used is not particularly limited, and may be any generally known method such as a sulfite method, a sulfate method, a soda method, or a kraft method.

These alkali-resistant cellulose fibers have a higher purity of cellulose than that of general cellulose fibers. While the general cellulose fibers have a crystal structure of cellulose I, these alkali-resistant cellulose fibers contain a crystal structure of cellulose II.

Such high-purity cellulose fibers containing cellulose II have excellent dimensional stability and chemical stability in an electrolyte solution.

This is considered to be because the alkali treatment is performed during the fiber manufacturing process, and thus dimensional changes such as shrinking hardly occur even when the fiber is immersed in alkali again. It is considered that, due to this alkali treatment, components that elute into alkali are extracted in advance, and thus, the raw material has excellent chemical stability in the electrolyte solution.

Meanwhile, as the alkali-resistant cellulose fiber, a regenerated cellulose fiber has a low degree of polymerization of cellulose of about 300 to 500. For this reason, the regenerated cellulose fiber is more likely to be dissolved in the electrolyte solution than the dissolving pulp or the mercerized pulp is dissolved, and has poorer alkali resistance than that of the dissolving pulp and mercerized pulp. The $\alpha$-cellulose content rate of the regenerated cellulose fiber is about 60% in a rayon fiber, and about 80% in a lyocell fiber having a relatively high degree of polymerization. Meanwhile, the $\alpha$-cellulose content rate of the dissolving pulp is 92% or more. As described above, since the regenerated cellulose fiber has a low $\alpha$-cellulose content rate, the regenerated cellulose fiber is more likely to be dissolved in the alkaline electrolyte solution than the dissolving pulp or the mercerized pulp is dissolved. Therefore, in the present invention, the dissolving pulp or the mercerized pulp is preferable.

From the above reasons, the above-described alkali-resistant cellulose fiber can be said to be excellent in order to improve the dimensional stability and chemical stability of the separator.

In order to improve the shielding properties and liquid holding properties of the separator, it is important to control the beating of the alkali-resistant cellulose fiber.

The fibers are beaten and are finer as they are dispersed in water and put under a shear force. The raw material containing the highly beaten alkali-resistant cellulose fiber is made into paper, which makes it possible to achieve a very dense separator having excellent shielding properties. Meanwhile, in the case of an alkali-resistant cellulose fiber having a low degree of beating, the fiber is lightly fine, which makes it possible to achieve a separator having excellent liquid holding properties.

In Examples and the like according to the present invention, a value obtained by measuring the freeness of cellulose to be used, according to "JIS P 8121-2 Pulp-Determination of freeness-Part 2: Canadian Standard freeness method" is used. The "Canadian standard freeness" represents the volume, in ml, of filtered water collected from a side orifice of a Canadian standard freeness meter.

Specifically, the above measurement method is a method for measuring the amount of the filtered water that passes through a fiber mat formed on a sieve plate having ninety seven 0.5 mm-diameter holes per 1 $cm^2$, and is discharged from the side orifice in a measurement funnel.

As the degree of beating of the alkali-resistant cellulose fiber contained in the fiber layer A, a CSF value is preferably in the range of 200 to 0 ml.

When the CSF value is higher than 200 ml, occurrence of fibrils is insufficient, whereby the denseness is insufficient, and the shielding properties may not be securable, which is not preferable.

The fiber length of the alkali-resistant cellulose fiber contained in the fiber layer A may be any fiber length in consideration of the shielding properties and papermaking properties of the separator.

In particular, when the length-weighted average fiber length as the fiber length of the alkali-resistant cellulose fiber contained in the fiber layer A is in the range of 0.4 to 0.8 mm, the shielding properties of the separator is likely to be set in a preferable range.

The length-weighted average fiber length was measured by using an apparatus described in "JIS P 8226-2 'Pulps-Determination of fibre length by automated optical analysis-Part 2: Unpolarized light method (ISO 16065-2)'", here, kajaani Fiber Lab (manufactured by Metso Automation Co., Ltd.).

When the fiber length is shorter than 0.4 mm, the physical entanglement between the fibers is too small, whereby the strength of the wet paper web is decreased during papermaking, which makes it difficult to manufacture the separator. Fibers fall out of papermaking screens during papermaking, which makes it difficult to improve the denseness and strength of the separator.

When the fiber length is more than 0.8 mm, the bulkiness is increased, and the shielding properties are decreased. This is apt to cause the internal short circuit of the battery to occur, which is not preferable.

When the CSF value and the fiber length of the alkali-resistant cellulose fiber contained in the fiber layer A are within the above ranges, the shielding properties of the separator are improved, whereby the short circuit failure of the alkaline battery can be reduced.

As the degree of beating of the alkali-resistant cellulose fiber contained in the fiber layer B, the CSF value is preferably within the range of 700 to 500 ml.

When the CSF value is higher than 700 ml, many unbeaten fibers are present, and an inter-fiber bond is weak, which may cause an increased amount of fibers dropping off due to fuzz on the separator. When the amount of fibers falling off is increased, the thickness of the falling-off portion is thinner, whereby the shielding properties of the separator is deteriorated, resulting in an alkaline battery having many short circuit failures. In the manufacturing process of the alkaline battery, fibers that have fallen off may adhere to the manufacturing machine, whereby the productivity of the battery is deteriorated. Therefore, it is necessary to periodically stop the manufacturing line to remove the fibers that have fallen off.

When the CSF value is lower than 500 ml, occurrence of fibrils is excessive; the denseness is increased; and voids that can hold liquid between fibers are decreased. Therefore, excellent liquid holding properties cannot be secured.

When the CSF value of the alkali-resistant cellulose fiber contained in the fiber layer B is within the above range, the liquid holding properties of the separator are improved, which can contribute to a longer life of the alkaline battery.

The fiber length of the alkali-resistant cellulose fiber contained in the fiber layer B may be any fiber length in consideration of the liquid holding properties of the separator. In particular, when the length-weighted average fiber length as the fiber length of the alkali-resistant cellulose fiber contained in the fiber layer B is in the range of 1.2 to 1.8 mm, the liquid holding properties of the separator are likely to be set in a preferable range.

When the fiber length is shorter than 1.2 mm, voids during sheet formation are likely to be filled with fibers having a short fiber length, whereby the amount of voids between the fibers of the separator is decreased, which is apt to cause deteriorated liquid holding properties.

When the fiber length is more than 1.8 mm, the bulkiness is apt to be increased, and the fibers are less physically entangled with each other, whereby the strength of the separator is apt to be weak. Therefore, the fibers may fall off from the separator, which may lead to deteriorated productivity during the manufacture of the battery.

When the CSF value and fiber length of the alkali-resistant cellulose fiber contained in the fiber layer B are within the above ranges, the liquid holding properties of the separator are improved, whereby the long life of the alkaline battery can be achieved.

The facility used for beating the fibers may be any facility as long as it is usually used for the manufacture of papermaking raw materials. General examples thereof include a beater, a conical refiner, a disc refiner, and a high-pressure homogenizer.

By controlling the CSF to be in the above range, the shielding properties of the fiber layer A and the liquid holding properties of the fiber layer B described above can be improved.

When the density of the fiber layer A is more than 0.62 $g/cm^3$, the ion resistance is increased or the difference in density between the fiber layer A and the fiber layer B is increased, whereby the curl of the separator may occur depending on humidity change. When the density of the fiber layer A is less than 0.52 $g/cm^3$, the shielding properties may be insufficient even within the above CSF range. When the thickness of the fiber layer A is more than 35 µm, increased ion resistance and a decreased mass of the active material cause a decreased discharge capacity of the battery. When the thickness of the fiber layer A is less than 25 µm, the shielding properties are deteriorated.

When the density of the fiber layer B is more than 0.50 $g/cm^3$, the liquid holding amount is decreased and the ion resistance is increased. When the density of the fiber layer B is less than 0.40 $g/cm^3$, insufficient strength of the separator or a large difference in density between the fiber layer B and the fiber layer A may cause the curl. When the thickness of the fiber layer B is more than 35 µm, the increased ion resistance and the decreased mass of the active material cause the decreased discharge capacity of the battery. When the thickness of the fiber layer B is less than 25 µm, the liquid holding amount is insufficient, and the inter-electrode distance is insufficient, which may cause deteriorated shielding properties.

By integrally stacking the fiber layer A having shielding properties and the fiber layer B having liquid holding properties, a separator having excellent shielding properties and liquid holding properties can be achieved. In addition, in the separator of the present invention, the difference in density between the fiber layer A and the fiber layer B is small, whereby the occurrence of the curl can be suppressed.

In the case of a single layer instead of two layers of the fiber layer A and the fiber layer B of the present invention, a separator having both shielding properties and liquid holding properties cannot be achieved. Meanwhile, in the case of a multilayer of three or more layers, the thickness of one layer is as small as 20 µm or less, which causes a problem that the strength of one layer is decreased, which disadvantageously causes difficult manufacture.

For example, when two of the fiber layer A as the single layer and the fiber layer B as the single layer are overlapped, or when three or more layers are overlapped, there are problems that the thickness of the single layer is small and the strength is low as described above, and that misalignment is apt to occur during cylinder molding of the separator during the battery manufacturing process, which is apt to cause processing failure.

As described above, the phrase "integrally stacked" in the present invention refer to not a state where the fiber layer A and the fiber layer B are simply overlapped, but a state where the fiber layers are integrated to such an extent that the fiber layers are not individually separated or peeled even when the fiber layers are immersed in an electrolyte solution or the like.

When the fiber layer A and the fiber layer B having the above thickness and density ranges are integrally stacked, the density of the entirety of the separator is in the range of 0.45 to 0.57 $g/cm^3$ and the thickness thereof is in the range of 50 to 70 µm, whereby the separator having both excellent shielding properties and excellent liquid holding properties can be obtained.

The fiber layer A and the fiber layer B preferably contain 60 to 90% by mass of an alkali-resistant cellulose fiber and 10 to 40% by mass of an alkali-resistant synthetic fiber. Furthermore, from the viewpoint of dimensional stability, shielding properties, and liquid holding properties, the fiber layer A and the fiber layer B more preferably contain 65 to 85% by mass of an alkali-resistant cellulose fiber and 15 to 35% by mass of an alkali-resistant synthetic fiber.

When the content of the alkali-resistant cellulose fiber in the fiber layer A and the fiber layer B is less than 60% by mass, it may be difficult to sufficiently secure the shielding properties or the liquid holding properties obtained by controlling to the CSF. When the content of the alkali-resistant cellulose fiber of the fiber layer A and the fiber layer B is more than 90% by mass, the effects of dimensional stability and chemical stability obtained by using the following alkali-resistant synthetic fiber may not be obtained, which is not preferable.

As the alkali-resistant synthetic fiber, a vinylon fiber, a polypropylene fiber, and a polyamide fiber such as a nylon-6 fiber or a nylon-6,6 fiber, and the like can be used as a material that do not dissolve and shrink in the electrolyte solution.

The fineness as the fiber diameter of the synthetic fiber is preferably 0.1 dtex to 2.2 dtex, and the fiber length of the synthetic fiber is preferably 2 mm to 5 mm. Furthermore, from the viewpoint of shielding properties, it is more preferable that the fineness is 0.1 to 1.5 dtex and the fiber length is 2 to 3 mm. Among these alkali-resistant synthetic fibers, the vinylon fiber is particularly preferable. The vinylon fiber is a fiber obtained by reacting a polyvinyl alcohol fiber obtained by spinning with formaldehyde or the like to acetalize hydroxyl groups of the polyvinyl alcohol fiber. The vinylon fiber is hardly dissolved in the alkaline electrolyte solution, and hardly changes in dimension in the electrolyte solution. For this reason, if the vinylon fiber is blended in the separator composed of only the alkali-resistant cellulose fiber, the dimensional shrinkage of the separator in the electrolyte solution can be further reduced.

The separator contains more than 10% by mass of the alkali-resistant synthetic fiber, whereby the dimensional stability can be further stabilized, which is preferable. More than 10% by mass of the alkali-resistant synthetic fiber is contained, whereby both dimensional changes in a flow direction (MD) parallel to a traveling direction and a lateral direction (CD) perpendicular to the flow direction during the manufacture of the separator can be controlled to 1% or less. Furthermore, it is more preferable that the separator contains more than 15% by mass of the alkali-resistant synthetic fiber.

When more than 40% by mass of the alkali-resistant synthetic fiber is contained, the dimensional stability is not improved even if the shielding properties are deteriorated or the alkali-resistant synthetic fiber is further contained, whereby an effect of containing the alkali-resistant synthetic fiber is small.

A method for forming a two-layer separator including the fiber layer A and the fiber layer B is preferably a papermaking method, and the two-layer separator can be obtained by stacking papermaking using fourdrinier papermaking and cylinder papermaking, or stacking papermaking using tanmo papermaking and cylinder papermaking.

In the separator for alkaline batteries of the present invention, the fiber layer B preferably contains a polyvinyl alcohol resin. The polyvinyl alcohol resin is contained in the fiber layer B, whereby an increase in the strength of the separator in the electrolyte solution and improvement in the dimensional stability of the separator can be achieved, and an increase in the resistance value can also be suppressed. This is due to the following reasons.

In a conventional separator, polyvinyl alcohol fibers are mixed in papermaking raw materials, and then dissolved and solidified in a drying step to bond the fibers, thereby improving the strength of the separator in an alkaline electrolyte solution. However, the fibrous polyvinyl alcohol is widely dispersed in a wet paper web, and the fibrous polyvinyl alcohol is dissolved and solidified to clog voids in the entirety of the separator. Since polyvinyl alcohol widely and homogeneously permeates the entirety of the separator, it is difficult to reduce the content of polyvinyl alcohol in order to maintain the strength of the separator in an electrolyte solution that can withstand practical use. For this reason, the resistance value of the separator is increased.

In the separator of the present invention, the fiber layer B preferably contains a polyvinyl alcohol resin as an alkali-resistant resin. The content of the alkali-resistant resin (polyvinyl alcohol resin) in the fiber layer B is preferably 0.3 to 1.5 $g/m^2$.

When the content is less than 0.3 $g/m^2$, the strength and dimensional stability of the separator in the electrolyte solution are insufficient. When the content is more than 1.5 $g/m^2$, it is difficult to suppress an increase in the resistance value. When the content is more than 1.5 $g/m^2$, deterioration in the liquid holding properties of the separator may cause a shortened life of the battery.

Meanwhile, when the polyvinyl alcohol resin is contained in the highly dense fiber layer A, voids in the entirety of the fine fiber surface have a strong tendency to be filled with the resin, whereby the ion resistance is significantly increased. Therefore, the polyvinyl alcohol resin is preferably contained in the fiber layer B.

The separator of the present invention can be manufactured, for example, by applying a coating solution containing a polyvinyl alcohol resin to the fiber layer B side of a sheet obtained by integrally stacking the fiber layer A and the fiber layer B, followed by drying, but is not limited thereto.

When the polyvinyl alcohol resin is contained in the fiber layer B by applying the coating solution to the fiber layer B side, the fiber layer B has high liquid holding properties, whereby the entirety of the fiber layer B is impregnated with the coating solution. Since the fiber layer B has a sparse structure, the coating solution is not dried in a state where a film is formed in a void part when the coating solution is dried, and the polyvinyl alcohol resin is fixed to each fiber so as to cover the fiber. At this time, the fibers are bonded to each other, whereby the strength and dimensional stability of the fiber layer B in the alkaline electrolyte solution are significantly improved. For this reason, even if the content of the alkali-resistant resin in the separator is reduced as compared with a conventional case, the strength of the separator in the alkaline electrolyte solution can be sufficiently improved.

As a result, an increase in the resistance value is significantly suppressed as compared with the separator having a configuration in which polyvinyl alcohol is bonded inside the sheet by mixing the polyvinyl alcohol fiber in the raw materials.

As a method for applying the coating solution containing the polyvinyl alcohol resin, a conventionally used method can be used without particular limitation.

Specifically, facilities such as a roll coater, a die coater, a blade coater, a bar coater, an impregnation coater, a spray coater, and a curtain coater can be used, but are not limited thereto.

The main point of application when manufacturing the separator for alkaline batteries of the present invention is to homogeneously apply the polyvinyl alcohol resin to the fiber layer B side. For this reason, any method can be employed without being limited to the above methods as long as the polyvinyl alcohol resin can be homogeneously applied to the fiber layer B side.

The alkali-resistant resin used in the present invention is preferably a polyvinyl alcohol resin from the viewpoint of affinity with the electrolyte solution.

In the present invention, the polymerization degree and saponification degree of these polyvinyl alcohol resins can be used without particular limitation.

The coating solution containing the polyvinyl alcohol resin is preferably applied as an aqueous solution. The coating solution containing the polyvinyl alcohol resin preferably contains an additive that can improve the lyophilicity of the alkaline electrolyte solution of the separator.

When the polyvinyl alcohol resin containing such an additive is applied, the liquid absorption properties of the separator can be improved.

The additive described above can be used without particular limitation as long as it has good affinity with the alkaline electrolyte solution. Specific examples thereof include a nonionic surfactant and an anionic surfactant.

The thickness of the separator for alkaline batteries of the present invention may be adjusted by calendaring and embossing and the like so as to satisfy the above-described thickness and density.

The above configuration provides a separator for alkaline batteries, which exhibits excellent strength, dimensional stability, and chemical stability in the electrolyte solution, while having high shielding properties, high liquid holding properties, and low resistance.

The performance of the alkaline battery using this separator is improved.

The alkaline battery of the present invention has a configuration in which the positive electrode active material and the negative electrode active material are separated from each other by the separator for alkaline batteries of the present invention.

The alkaline battery of the present invention can be used without any problem in various batteries using an alkaline electrolyte solution, such as an alkaline manganese battery, a nickel zinc battery, a silver oxide battery, and a zinc-air battery.

In the alkaline battery of the present invention, the separator of the present invention may be used, and the manufacturing method and size of the alkaline battery are not particularly limited. The separator of the present invention is preferably used in the alkaline battery which has an AA or AAA shape strongly required to reduce the occupied volume of the separator.

In the separator for alkaline batteries of the present invention, the alkaline battery can be configured without any problem even when the fiber layer B containing the polyvinyl alcohol resin is disposed on either the positive electrode side or the negative electrode side.

Since the separator of the present invention has excellent shielding properties, the thickness of the separator can be reduced. However, when the separator is used in a battery in which the demand for thickness reduction is not particularly strong, the use of the separator in combination with another separator having particularly excellent liquid holding properties makes it possible to further increase the held amount of the electrolyte solution from the separator of the present invention. This can provide a battery having excellent reliability and a further long life.

EXAMPLES

Hereinafter, specific Examples, Comparative Examples, and Conventional Examples of a separator for alkaline batteries according to the present invention will be described in detail.

In the separator for alkaline batteries of each of Examples of the present invention described later, a nonwoven fabric was obtained by a papermaking method using a fourdrinier cylinder paper machine or a tanmo cylinder paper machine or the like. That is, the separator was composed of a wet nonwoven fabric.

[Method for Evaluating Separator]

The specific characteristics of the separator for alkaline batteries of each of Examples, Comparative Examples, Conventional Examples, and Reference Examples were measured under the following conditions by the following methods.

[Thickness]

The thickness of the separator was measured by using a micrometer described in "5.1.1 Measuring instrument and measuring method, a) case of using an outer side micrometer" prescribed in "JIS C 2300-2, 'Cellulosic papers for electrical purposes-Part 2: Methods of test', 5.1 Thickness" and by a method involving "5.1.3 Case of measuring thickness by folding paper" in which paper was folded in 10.

[Density]

The density of the separator in a bone dry condition was measured by the method prescribed in the B method of "JIS C 2300-2, 'Cellulosic papers for electrical purposes-Part 2: Methods of test', 7.0A Density".

[Amount of Component]

A separator having a size of 500 mm×500 mm was collected, and dispersed using an appropriate amount of pure water at 60° C. The obtained slurry was transferred to a beaker, and pure water was further added thereto to set the total amount to 1 L. This was left at 90 to 100° C. for 1 hour to dissolve a polyvinyl alcohol resin component. Thereafter, the slurry was filtered and further washed with 1 L of pure water at 90 to 100° C. The obtained residue was dried and the mass thereof was measured. The amount of a component was determined using the following formula (1).

$$\text{Amount of component } (g/m^2) = (W1 - W2) \times 4 \qquad \text{Formula (1)}$$

W1: mass of sample before dissolution, W2: mass of residue after dissolution

[Dimensional Change Rate]

The dimensional change rate of the separator was measured by the following method.

The separator was cut into a 100 mm×100 mm square to prepare a test piece, and lengths of the test piece in an MD direction and a CD direction were measured. Next, the test piece of the separator was immersed in a 40% by mass aqueous potassium hydroxide (KOH) solution at 20° C. for 10 min, and each length of the test piece after immersion (state of being wetted with the aqueous KOH solution) was measured. A dimensional change rate in each of the MD direction and the CD direction was calculated by the following formula (2).

$$\text{Dimensional change rate } (\%) = [(L2 - L1)/L1] \times 100 \qquad \text{Formula (2)}$$

L1: length before immersed in 40% by mass aqueous KOH solution

L2: length after immersed in 40% by mass aqueous KOH solution

[Area Change Rate]

The area change rate of the separator was calculated according to the following formula (3) by obtaining the area using L1 and L2 in the MD direction and the CD direction used for calculating the dimensional change rate.

$$\text{Area change rate (\%)} = [(A2-A1)/A1] \times 100 \quad \text{Formula (3)}$$

A1: Area before immersion=(L1 in MD direction)×(L1 in CD direction)

A2: Area after immersion=(L2 in MD direction)×(L2 in CD direction)

[Wet Strength]

A test piece having a width of 15 mm was taken from the separator in the MD direction, and immersed in a 40% by mass aqueous KOH solution for 3 min. Then, an excessive 40% by mass aqueous KOH solution adhering to the test piece was blotted with a paper filter. The tensile strength of the test piece wet with the 40% by mass aqueous KOH solution was measured according to the method prescribed in "JIS P 8113, 'Paper and board-Determination of tensile properties, Part 2: Constant rate of elongation method'", and the result was taken as the wet strength of the separator.

[Liquid Holding Amount]

The separator was cut into a 50 mm×50 mm square to prepare a test piece, and the test piece was immersed for 10 min in a 40% by mass aqueous KOH solution after measuring the mass after drying. This test piece was attached to a glass plate inclined at an angle of 45 degrees and fixed thereat for 3 min so as to remove the excessive 40% by mass aqueous KOH solution by allowing the solution to run down; the mass of the test piece was measured; and then the liquid holding amount was determined by the following formula (4).

$$\text{Liquid holding amount (g/m}^2\text{)} = (X2-X1) \times 400 \quad \text{Formula (4)}$$

X1: mass before immersion (mass after drying), X2: mass after immersion

[Gurley Value]

The Gurley value of the separator was measured by the method prescribed in "JIS P 8117 'Paper and board-Determination of air permeance and air (medium range)-Gurley method'" using a type B tester.

[Electrical Resistance]

The separator was inserted between platinum electrodes (circular electrodes having a diameter of 20 mm prepared by platinization of platinum) that were immersed in a 40% by mass aqueous KOH solution and extended parallel to each other with a space of about 2 mm therebetween; and the increase in electrical resistance (mΩ) between the electrodes due to the insertion was taken as the electrical resistance of the separator. The electrical resistance between the electrodes was measured at a frequency of 1000 Hz by using an LCR meter.

This measurement method is referred to as measuring the electrical resistance, but is a method for measuring the ion resistance of the separator in the electrolyte solution (40% by mass aqueous KOH solution).

[Curl]

Figure 2:
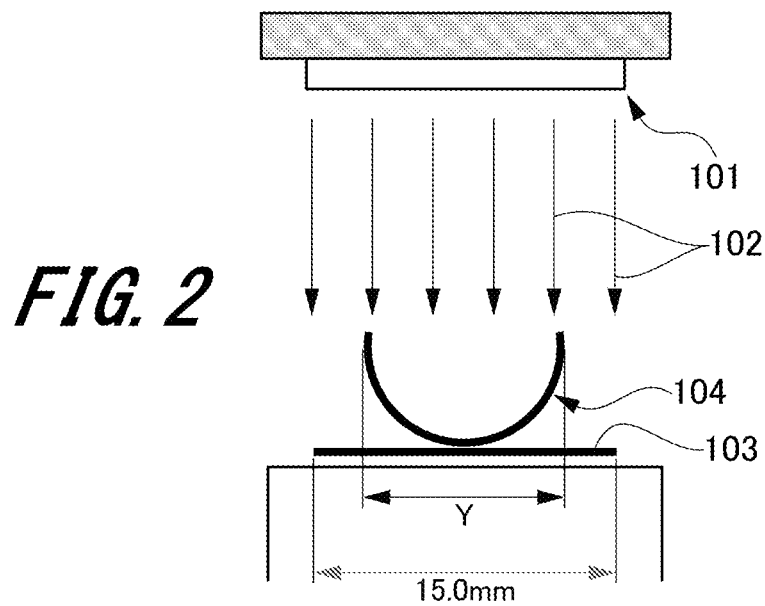
FIG. 2 is a schematic view illustrating a method of calculating the curl of a separator.

The separator was cut into a strip shape having a width of 15.0 mm to prepare a test piece, and the test piece was left in an oven at 105° C. for 30 min. After the test piece was taken out of the oven, the test piece was further left in a temperature of 23° C. and a humidity of 50% RH for 10 min. At this time, as shown in a schematic view in FIG. 2, an end part of a test piece 103 of the separator is warped upward to form a curled separator 104. The curled separator 104 was irradiated with light 102 from a light source 101 to measure a projected paper width Y, and the curl was calculated by the following formula (5).

$$\text{Curl (mm)} = 15.0 - Y \quad \text{Formula (5)}$$

Y: projected paper width after being left in 23° C. and 50% RH for 10 min

[Wet Strength after 100 Hours at 70° C.]

A test piece having a width of 15 mm was taken from the separator in the MD direction, and immersed in a 40% by mass aqueous KOH solution. The test piece was left at 70° C. for 100 hours, and then an excessive 40% by mass aqueous KOH solution adhering to the test piece was blotted with a paper filter. The tensile strength of the test piece wet with the 40% by mass aqueous KOH solution was measured according to the method prescribed in "JIS P 8113, 'Paper and board-Determination of tensile properties, Part 2: Constant rate of elongation method'", and the result was taken as the wet strength of the separator.

[Manufacture of Battery]

Using the separator of each of Examples, Comparative Examples, Conventional Examples, and Reference Examples, an alkaline manganese battery 1 (LR6) shown in a schematic configuration view of FIG. 1 was prepared.

An alkaline manganese battery 1 shown in FIG. 1 includes components such as a positive electrode can 2, a positive electrode mixture 3, a separator 4, a gelatinous negative electrode 5, a negative electrode current collector 6, a resin sealed unit 7, a negative electrode terminal plate 8, and a resin exterior material 9.

The positive electrode can 2 has a bottomed cylindrical shape, and a positive electrode terminal 2a is formed on one end part thereof. A cylindrical positive electrode mixture 3 made of manganese dioxide and graphite is press-fitted into the positive electrode can 2. The separator 4 is a cylindrically wound separator. The gelatinous negative electrode 5 obtained by mixing a mercury-free zinc alloy powder and an alkaline electrolyte solution is loaded in the separator 4.

The resin sealed unit 7 clogs an opening part of the positive electrode can 2. The negative electrode terminal plate 8 also serving as a negative electrode terminal is inserted into an opening part of the resin sealed unit 7. The negative electrode terminal plate 8 is welded to a head part of the negative electrode current collector 6.

The positive electrode terminal side of the cylindrical wound separator 4 is sealed by bonding or fusing an end part of the separator 4, thereby preventing a negative electrode and a positive electrode from coming into contact with each other. The resin exterior material 9 is packaged in close contact with the outer peripheral surface of the positive electrode can 2 in a state where the positive electrode terminal 2a and the negative electrode terminal plate 8 are exposed.

[Load Discharge Test]

A heavy load discharge test that measures the time (minutes) to the final voltage of 0.9V with a load of 2Ω and a light load discharge test that measures the time (hours) to the final voltage of 0.9V with a load of 100Ω are performed. The average value of each test result (number of samples n=100) was calculated.

[Intermittent Discharge Test]

One hundred undischarged batteries (voltage: 1.5 V) were each discharged at a load of 3.9Ω for 5 min/day, and the number of batteries decreased to 0.9 V or less within 50 days was counted as a failure rate (percentage).

[Short Circuit Rate after High Temperature Load]

One hundred undischarged batteries (voltage: 1.5 V) were left in an oven at 70° C. for 500 hours, and then allowed to cool to room temperature. The obtained batteries were dropped 10 times from a height of 1 m, and the number of batteries decreased to 0.9 V or less was counted as a failure rate (percentage).

Example 1

A fiber layer A and a fiber layer B were subjected to stacking papermaking to obtain an integrally stacked separator substrate. The fiber layer A was obtained by fourdrinier papermaking using raw materials obtained by mixing 90% by mass of mercerized softwood kraft pulp beaten to a CSF value of 200 ml and a fiber length of 0.6 mm, and 10% by mass of a polypropylene fiber having a fineness of 0.8 dtex and a fiber length of 3 mm. The fiber layer B was obtained by cylinder papermaking using raw materials obtained by mixing 90% by mass of mercerized softwood kraft pulp beaten to a CSF value of 700 ml and a fiber length of 1.8 mm, and 10% by mass of a polypropylene fiber having a fineness of 2.2 dtex and a fiber length of 5 mm. A coating solution in which a polyvinyl alcohol resin (polymerization degree: 4000, saponification degree: 99 mol %) was dissolved was applied to the fiber layer B side of the substrate, and dried to obtain a two-layer separator having a thickness of 60 μm, a density of 0.49 g/cm², and a resin content of 0.5 g/m². The separator had an MD dimensional change rate of −1.0%, a CD dimensional change rate of 0.7%, an area change rate of −0.3%, wet strength of 12.2 N, a liquid holding amount of 162 g/m², a Gurley value of 103 min/100 ml, electric resistance of 11.5 mΩ, a curl of 0.5 mm, and wet strength of 6.9 N after 100 hours at 70° C. The fiber layer A of the separator had a thickness of 25 μm and a density of 0.62 g/cm³, and the fiber layer B had a thickness of 35 μm and a density of 0.40 g/cm³.

Example 2

A fiber layer A and a fiber layer B were subjected to stacking papermaking to obtain an integrally stacked separator substrate. The fiber layer A was obtained by tanmo papermaking using raw materials obtained by mixing 60% by mass of mercerized softwood kraft pulp beaten to a CSF value of 0 ml and a fiber length of 0.7 mm and 40% by mass of a vinylon fiber having a fineness of 0.6 dtex and a fiber length of 2 mm. The fiber layer B was obtained by cylinder papermaking using raw materials obtained by mixing 60% by mass of mercerized softwood kraft pulp beaten to a CSF value of 550 ml and a fiber length of 1.2 mm, and 40% by mass of a vinylon fiber having a fineness of 0.6 dtex and a fiber length of 2 mm. A coating solution in which a polyvinyl alcohol resin (polymerization degree: 3000, saponification degree: 99 mol %) was dissolved was applied to the fiber layer B side of the substrate, and dried to obtain a two-layer separator having a thickness of 50 μm, a density of 0.51 g/cm³, and a resin content of 1.1 g/m². The separator had an MD dimensional change rate of −0.1%, a CD dimensional change rate of 0.0%, an area change rate of −0.1%, wet strength of 18.1 N, a liquid holding amount of 94 g/m², a Gurley value of 6 min/100 ml, electric resistance of 13.4 mΩ, a curl of 0.0 mm, and wet strength of 8.5 N after 100 hours at 70° C. The fiber layer A of the separator had a thickness of 25 μm and a density of 0.52 g/cm³, and the fiber layer B had a thickness of 25 μm and a density of 0.50 g/cm³.

Example 3

A fiber layer A and a fiber layer B were subjected to stacking papermaking to obtain an integrally stacked separator substrate. The fiber layer A was obtained by fourdrinier papermaking using raw materials obtained by mixing 65% by mass of softwood sulfite dissolving pulp beaten to a CSF value of 100 ml and a fiber length of 0.5 mm, and 35% by mass of a vinylon fiber having a fineness of 0.6 dtex and a fiber length of 2 mm. The fiber layer B was obtained by cylinder papermaking using raw materials obtained by mixing 65% by mass of softwood sulfite dissolving pulp beaten to a CSF value of 500 ml and a fiber length of 1.3 mm, and 35% by mass of a vinylon fiber having a fineness of 0.6 dtex and a fiber length of 2 mm. A coating solution in which a polyvinyl alcohol resin (polymerization degree: 4000, saponification degree: 99 mol %) was dissolved was applied to the fiber layer B side of the substrate, and dried to obtain a two-layer separator having a thickness of 55 μm, a density of 0.57 g/cm³, and a resin content of 0.8 g/m². The separator had an MD dimensional change rate of −0.2%, a CD dimensional change rate of 0.1%, an area change rate of −0.1%, wet strength of 16.5 N, a liquid holding amount of 103 g/m², a Gurley value of 39 min/100 ml, electric resistance of 14.4 mΩ, a curl of 0.3 mm, and wet strength of 7.6 N after 100 hours at 70° C. The fiber layer A of the separator had a thickness of 30 μm and a density of 0.62 g/cm³, and the fiber layer B had a thickness of 25 μm and a density of 0.50 g/cm³.

Example 4

A fiber layer A and a fiber layer B were subjected to stacking papermaking to obtain an integrally stacked separator substrate. The fiber layer A was obtained by fourdrinier papermaking using raw materials obtained by mixing 85% by mass of mercerized softwood kraft pulp beaten to a CSF value of 150 ml and a fiber length of 0.4 mm, and 15% by mass of a vinylon fiber having a fineness of 1.1 dtex and a fiber length of 3 mm. The fiber layer B was obtained by cylinder papermaking using raw materials obtained by mixing 85% by mass of softwood sulfite dissolved pulp beaten to a CSF value of 650 ml and a fiber length of 1.5 mm, 10% by mass of a vinylon fiber having a fineness of 1.1 dtex and a fiber length of 3 mm, and 5% by mass of a nylon fiber having a fineness of 2.2 dtex and a fiber length of 3 mm. A coating solution in which a polyvinyl alcohol resin (polymerization degree: 2500, saponification degree: 99 mol %) was dissolved was applied to the fiber layer B side of the substrate, and dried to obtain a two-layer separator having a thickness of 70 μm, a density of 0.52 g/cm³, and a resin content of 1.5 g/m². The separator had an MD dimensional change rate of −0.5%, a CD dimensional change rate of 0.3%, an area change rate of −0.2%, wet strength of 22.7 N, a liquid holding amount of 133 g/m², a Gurley value of 80 min/100 ml, electric resistance of 16.4 mΩ, a curl of 0.1 mm, and wet strength of 10.6 N after 100 hours at 70° C. The fiber layer A of the separator had a thickness of 35 μm and a density of 0.55 g/cm³, and the fiber layer B had a thickness of 35 μm and a density of 0.48 g/cm³.

Example 5

A fiber layer A and a fiber layer B were subjected to stacking papermaking to obtain an integrally stacked separator substrate. The fiber layer A was obtained by fourdrinier papermaking using raw materials obtained by mixing 80% by mass of softwood sulfite dissolving pulp beaten to a CSF value of 50 ml and a fiber length of 0.8 mm, and 20% by mass of a vinylon fiber having a fineness of 0.6 dtex and a fiber length of 2 mm. The fiber layer B was obtained by cylinder papermaking using raw materials obtained by mixing 70% by mass of mercerized softwood kraft pulp beaten to a CSF value of 650 ml and a fiber length of 1.7 mm, and 30% by mass of a vinylon fiber having a fineness of 0.6 dtex and a fiber length of 2 mm. A coating solution in which a polyvinyl alcohol resin (polymerization degree: 3000, saponification degree: 99 mol %) and a surfactant (sodium alkyl ether sulfate ester) were dissolved was applied to the fiber layer B side of the substrate, and dried to obtain a two-layer separator having a thickness of 60 μm, a density of 0.45 g/cm$^3$, and a resin content of 0.3 g/m$^2$. The separator had an MD dimensional change rate of −0.2%, a CD dimensional change rate of 0.2%, an area change rate of 0.0%, wet strength of 10.5 N, a liquid holding amount of 157 g/m$^2$, a Gurley value of 9 min/100 ml, electric resistance of 11.8 mΩ, a curl of 0.2 mm, and wet strength of 5.2 N after 100 hours at 70° C. The fiber layer A of the separator had a thickness of 25 μm and a density of 0.52 g/cm$^3$, and the fiber layer B had a thickness of 35 μm and a density of 0.40 g/cm$^3$.

Comparative Example 1

A coating solution in which a polyvinyl alcohol resin (polymerization degree: 2500, saponification degree: 99 mol %) was dissolved was applied to a substrate obtained by fourdrinier papermaking using the same raw materials as those of the fiber layer A of Example 1, and dried to obtain a one-layer separator having a thickness of 60 μm, a density of 0.62 g/cm$^3$, and a resin content of 1.0 g/m$^2$. The separator had an MD dimensional change rate of −1.0%, a CD dimensional change rate of 0.8%, an area change rate of −0.2%, wet strength of 10.1 N, a liquid holding amount of 70 g/m$^2$, a Gurley value of 201 min/100 ml, electric resistance of 24.6 mΩ, a curl of 0.0 mm, and wet strength of 5.3 N after 100 hours at 70° C.

Comparative Example 2

A fiber layer A and a fiber layer B were subjected to stacking papermaking to obtain an integrally stacked separator substrate. The fiber layer A was obtained by fourdrinier papermaking using raw materials obtained by mixing 95% by mass of mercerized softwood kraft pulp beaten to a CSF value of 180 ml and a fiber length of 0.6 mm, and 5% by mass of a polypropylene fiber having a fineness of 0.8 dtex and a fiber length of 3 mm. The fiber layer B was obtained by cylinder papermaking using raw materials obtained by mixing 95% by mass of mercerized softwood kraft pulp beaten to a CSF value of 660 ml and a fiber length of 1.6 mm, and 5% by mass of a polypropylene fiber having a fineness of 2.2 dtex and a fiber length of 5 mm. A coating solution in which a polyvinyl alcohol resin (polymerization degree: 3000, saponification degree: 99 mol %) was dissolved was applied to the fiber layer B side of the substrate, and dried to obtain a two-layer separator having a thickness of 60 μm, a density of 0.48 g/cm$^3$, and a resin content of 0.5 g/m$^2$. The separator had an MD dimensional change rate of −1.3%, a CD dimensional change rate of 1.1%, an area change rate of −0.2%, wet strength of 12.1 N, a liquid holding amount of 158 g/m$^2$, a Gurley value of 106 min/100 ml, electric resistance of 11.4 mΩ, a curl of 0.6 mm, and wet strength of 6.6 N after 100 hours at 70° C. The fiber layer A of the separator had a thickness of 25 μm and a density of 0.62 g/cm$^3$, and the fiber layer B had a thickness of 35 μm and a density of 0.38 g/cm$^3$.

Comparative Example 3

A fiber layer A and a fiber layer B were subjected to stacking papermaking to obtain an integrally stacked separator substrate. The fiber layer A was obtained by tanmo papermaking using raw materials obtained by mixing 55% by mass of mercerized softwood kraft pulp beaten to a CSF value of 150 ml and a fiber length of 0.6 mm, and 45% by mass of a vinylon fiber having a fineness of 0.6 dtex and a fiber length of 2 mm. The fiber layer B was obtained by cylinder papermaking using raw materials obtained by mixing 55% by mass of mercerized softwood kraft pulp beaten to a CSF value of 650 ml and a fiber length of 1.6 mm, and 45% by mass of a vinylon fiber having a fineness of 0.6 dtex and a fiber length of 2 mm. A coating solution in which a polyvinyl alcohol resin (polymerization degree: 4000, saponification degree: 99 mol %) was dissolved was applied to the fiber layer B side of the substrate, and dried to obtain a two-layer separator having a thickness of 60 μm, a density of 0.49 g/cm$^3$, and a resin content of 0.9 g/m$^2$. The separator had an MD dimensional change rate of 0.0%, a CD dimensional change rate of 0.0%, an area change rate of 0.0%, wet strength of 15.8 N, a liquid holding amount of 70 g/m$^2$, a Gurley value of 3 min/100 ml, electric resistance of 15.1 mΩ, a curl of 0.1 mm, and wet strength of 8.1 N after 100 hours at 70° C. The fiber layer A of the separator had a thickness of 30 μm and a density of 0.52 g/cm$^3$, and the fiber layer B had a thickness of 30 μm and a density of 0.45 g/cm$^3$.

Comparative Example 4

A fiber layer A and a fiber layer B were subjected to stacking papermaking to obtain an integrally stacked separator substrate. The fiber layer A was obtained by fourdrinier papermaking using raw materials obtained by mixing 90% by mass of mercerized softwood kraft pulp beaten to a CSF value of 180 ml and a fiber length of 0.9 mm, and 10% by mass of a polypropylene fiber having a fineness of 0.8 dtex and a fiber length of 3 mm. The fiber layer B was obtained by cylinder papermaking using raw materials obtained by mixing 90% by mass of mercerized softwood kraft pulp beaten to a CSF value of 700 ml and a fiber length of 1.6 mm, and 10% by mass of a polypropylene fiber having a fineness of 2.2 dtex and a fiber length of 5 mm. A coating solution in which a polyvinyl alcohol resin (polymerization degree: 2500, saponification degree: 99 mol %) was dissolved was applied to the fiber layer B side of the substrate, and dried to obtain a two-layer separator having a thickness of 62 μm, a density of 0.44 g/cm$^3$, and a resin content of 1.2 g/m$^2$. The separator had an MD dimensional change rate of −0.8%, a CD dimensional change rate of 0.7%, an area change rate of −0.1%, wet strength of 17.4 N, a liquid holding amount of 149 g/m$^2$, a Gurley value of 1 min/100 ml, electric resistance of 14.0 mΩ, a curl of 0.2 mm, and wet strength of 8.3 N after 100 hours at 70° C. The fiber layer A of the separator had a thickness of 25 μm and a density of 0.51 g/cm$^3$, and the fiber layer B had a thickness of 37 μm and a density of 0.40 g/cm$^3$.

Comparative Example 5

A fiber layer A and a fiber layer B were subjected to stacking papermaking to obtain an integrally stacked separator substrate. The fiber layer A was obtained by tanmo papermaking using raw materials obtained by mixing 60% by mass of mercerized softwood kraft pulp beaten to a CSF value of 250 ml and a fiber length of 1.0 mm, and 40% by mass of a vinylon fiber having a fineness of 0.6 dtex and a fiber length of 2 mm. The fiber layer B was obtained by cylinder papermaking using raw materials obtained by mixing 60% by mass of mercerized softwood kraft pulp beaten to a CSF value of 550 ml and a fiber length of 1.2 mm, and 40% by mass of a vinylon fiber having a fineness of 0.6 dtex and a fiber length of 2 mm. A coating solution in which a polyvinyl alcohol resin (polymerization degree: 3000, saponification degree: 99 mol %) was dissolved was applied to the fiber layer B side of the substrate, and dried to obtain a two-layer separator having a thickness of 55 µm, a density of 0.50 g/cm$^3$, and a resin content of 0.2 g/m$^2$. The separator had an MD dimensional change rate of −0.1%, a CD dimensional change rate of 0.0%, an area change rate of −0.1%, wet strength of 6.9 N, a liquid holding amount of 80 g/m$^2$, a Gurley value of 0 min/100 ml, electric resistance of 11.6 mΩ, a curl of 0.1 mm, and wet strength of 4.1 N after 100 hours at 70° C. The fiber layer A of the separator had a thickness of 32 µm and a density of 0.52 g/cm$^3$, and the fiber layer B had a thickness of 23 µm and a density of 0.48 g/cm$^3$.

Comparative Example 6

An attempt was made to subject a fiber layer A and a fiber layer B to stacking papermaking. The fiber layer A was obtained by tanmo papermaking using raw materials obtained by mixing 60% by mass of mercerized softwood kraft pulp beaten to a CSF value of 400 ml and a fiber length of 0.2 mm, and 40% by mass of a vinylon fiber having a fineness of 0.6 dtex and a fiber length of 2 mm. The fiber layer B was obtained by cylinder papermaking using raw materials obtained by mixing 60% by mass of mercerized softwood kraft pulp beaten to a CSF value of 550 ml and a fiber length of 1.2 mm, and 40% by mass of a vinylon fiber having a fineness of 0.6 dtex and a fiber length of 2 mm. However, a separator could not be produced.

Comparative Example 7

A fiber layer A and a fiber layer B were subjected to stacking papermaking to obtain an integrally stacked separator substrate. The fiber layer A was obtained by fourdrinier papermaking using raw materials obtained by mixing 90% by mass of mercerized softwood kraft pulp beaten to a CSF value of 200 ml and a fiber length of 0.4 mm, and 10% by mass of a polypropylene fiber having a fineness of 0.8 dtex and a fiber length of 3 mm. The fiber layer B was obtained by cylinder papermaking using raw materials obtained by mixing 90% by mass of mercerized softwood kraft pulp beaten to a CSF value of 740 ml and a fiber length of 1.9 mm, and 10% by mass of a polypropylene fiber having a fineness of 1.1 dtex and a fiber length of 3 mm. A coating solution in which a polyvinyl alcohol resin (polymerization degree: 4000, saponification degree: 99 mol %) was dissolved was applied to the fiber layer B side of the substrate, and dried to obtain a two-layer separator having a thickness of 64 µm, a density of 0.58 g/cm$^3$, and a resin content of 0.8 g/m$^2$. The separator had an MD dimensional change rate of −0.9%, a CD dimensional change rate of 0.5%, an area change rate of −0.4%, wet strength of 15.2 N, a liquid holding amount of 159 g/m$^2$, a Gurley value of 144 min/100 ml, electric resistance of 20.1 mΩ, a curl of 0.7 mm, and wet strength of 7.9 N after 100 hours at 70° C. The fiber layer A of the separator had a thickness of 39 µm and a density of 0.69 g/cm$^3$, and the fiber layer B had a thickness of 25 µm and a density of 0.40 g/cm$^3$.

Comparative Example 8

A fiber layer A and a fiber layer B were subjected to stacking papermaking to obtain an integrally stacked separator substrate. The fiber layer A was obtained by tanmo papermaking using raw materials obtained by mixing 60% by mass of mercerized softwood kraft pulp beaten to a CSF value of 0 ml and a fiber length of 0.6 mm, and 40% by mass of a vinylon fiber having a fineness of 0.6 dtex and a fiber length of 2 mm. The fiber layer B was obtained by cylinder papermaking using raw materials obtained by mixing 60% by mass of mercerized softwood kraft pulp beaten to a CSF value of 480 ml and a fiber length of 1.1 mm, and 40% by mass of a vinylon fiber having a fineness of 0.6 dtex and a fiber length of 2 mm. A coating solution in which a polyvinyl alcohol resin (polymerization degree: 3000, saponification degree: 99 mol %) was dissolved was applied to the fiber layer B side of the substrate, and dried to obtain a two-layer separator having a thickness of 65 µm, a density of 0.52 g/cm$^3$, and a resin content of 0.4 g/m$^2$. The separator had an MD dimensional change rate of −0.1%, a CD dimensional change rate of 0.1%, an area change rate of 0.0%, wet strength of 10.9 N, a liquid holding amount of 81 g/m$^2$, a Gurley value of 21 min/100 ml, electric resistance of 12.7 mΩ, a curl of 0.0 mm, and wet strength of 6.1 N after 100 hours at 70° C. The fiber layer A of the separator had a thickness of 35 µm and a density of 0.52 g/cm$^3$, and the fiber layer B had a thickness of 30 µm and a density of 0.52 g/cm$^3$.

Comparative Example 9

A fiber layer A and a fiber layer B were subjected to stacking papermaking to obtain an integrally stacked separator substrate. The fiber layer A was obtained by fourdrinier papermaking using raw materials obtained by mixing 80% by mass of mercerized softwood kraft pulp beaten to a CSF value of 150 ml and a fiber length of 0.6 mm, and 20% by mass of a vinylon fiber having a fineness of 1.1 dtex and a fiber length of 3 mm. The fiber layer B was obtained by cylinder papermaking using raw materials obtained by mixing 70% by mass of softwood sulfite dissolved pulp beaten to a CSF value of 550 ml and a fiber length of 1.4 mm, 25% by mass of a vinylon fiber having a fineness of 1.1 dtex and a fiber length of 3 mm, and 5% by mass of a nylon fiber having a fineness of 2.2 dtex and a fiber length of 3 mm. A coating solution in which a polyvinyl alcohol resin (polymerization degree: 4000, saponification degree: 99 mol %) and a surfactant (sodium alkyl ether sulfate ester) were dissolved was applied to the fiber layer B side of the substrate, and dried to obtain a two-layer separator having a thickness of 49 µm, a density of 0.56 g/cm$^3$, and a resin content of 1.8 g/m$^2$. The separator had an MD dimensional change rate of −0.2%, a CD dimensional change rate of 0.1%, an area change rate of −0.1%, wet strength of 23.6 N, a liquid holding amount of 63 g/m$^2$, a Gurley value of 4 min/100 ml, electric resistance of 20.2 mΩ, a curl of 0.2 mm, and wet strength of 11.8 N after 100 hours at 70° C. The fiber layer A of the separator had a thickness of 23 µm and a density of 0.62 g/cm$^3$, and the fiber layer B had a thickness of 26 µm and a density of 0.50 g/cm$^3$.

Comparative Example 10

A fiber layer A and a fiber layer B were subjected to stacking papermaking to obtain an integrally stacked separator substrate. The fiber layer A was obtained by fourdrinier papermaking using raw materials obtained by mixing 90% by mass of mercerized softwood kraft pulp beaten to a CSF value of 100 ml and a fiber length of 0.5 mm, and 10% by mass of a vinylon fiber having a fineness of 0.6 dtex and a fiber length of 2 mm. The fiber layer B was obtained by cylinder papermaking using raw materials obtained by mixing 90% by mass of mercerized softwood kraft pulp beaten to a CSF value of 500 ml and a fiber length of 1.3 mm, and 10% by mass of a vinylon fiber having a fineness of 0.6 dtex and a fiber length of 2 mm. A coating solution in which a polyvinyl alcohol resin (polymerization degree: 2500, saponification degree 99 mol %) was dissolved was applied to the fiber layer A side of the substrate, and dried to obtain a two-layer separator having a thickness of 50 μm, a density of 0.54 g/cm$^3$, and a content of the fiber layer A of 0.8 g/m$^2$. The separator had an MD dimensional change rate of −1.0%, a CD dimensional change rate of 0.6%, an area change rate of −0.4%, wet strength of 9.2 N, a liquid holding amount of 92 g/m$^2$, a Gurley value of 198 min/100 ml, electric resistance of 23.4 mΩ, a curl of 0.5 mm, and wet strength of 5.1 N after 100 hours at 70° C. The fiber layer A of the separator had a thickness of 25 μm and a density of 0.62 g/cm$^3$, and the fiber layer B had a thickness of 25 μm and a density of 0.45 g/cm$^3$.

Comparative Example 11

A fiber layer A and a fiber layer B were subjected to stacking papermaking to obtain an integrally stacked separator substrate. The fiber layer A was obtained by fourdrinier papermaking using raw materials obtained by mixing 60% by mass of mercerized hardwood kraft pulp beaten to a CSF value of 100 ml and a fiber length of 0.5 mm, 30% by mass of a vinylon fiber having a fineness of 0.6 dtex and a fiber length of 2 mm, and 10% by mass of a PVA binder fiber having a fineness of 1.1 dtex and a fiber length of 3 mm. The fiber layer B was obtained by cylinder papermaking using raw materials obtained by mixing 60% by mass of mercerized hardwood kraft pulp beaten to a CSF value of 500 ml and a fiber length of 1.3 mm, 30% by mass of a vinylon fiber having a fineness of 0.6 dtex and a fiber length of 2 mm, and 10% by mass of a PVA binder fiber having a fiber length of 1.1 dtex and a fiber length of 3 mm. The substrate was dried to obtain a two-layer separator having a thickness of 65 μm and a density of 0.51 g/cm$^3$. The separator had an MD dimensional change rate of −0.1%, a CD dimensional change rate of 0.0%, an area change rate of −0.1%, wet strength of 15.6 N, a liquid holding amount of 87 g/m$^2$, a Gurley value of 22 min/100 ml, electric resistance of 22.6 mΩ, a curl of 0.1 mm, and wet strength of 8.0 N after 100 hours at 70° C. The fiber layer A of the separator had a thickness of 30 μm and a density of 0.55 g/cm$^3$, and the fiber layer B had a thickness of 35 μm and a density of 0.48 g/cm$^3$.

Conventional Example 1

A fiber layer A and a fiber layer B were subjected to stacking papermaking to obtain an integrally stacked separator substrate. The fiber layer A was obtained by cylinder papermaking using raw materials obtained by mixing 60% by mass of mercerized hardwood kraft pulp beaten to a CSF value of 290 ml and a fiber length of 1.2 mm, 20% by mass of a vinylon fiber having a fineness of 0.5 dtex and a fiber length of 2 mm, and 20% by mass of a PVA binder fiber having a fineness of 1.0 dtex and a fiber length of 3 mm. The fiber layer B was obtained by cylinder papermaking using raw materials obtained by mixing 60% by mass of a polynosic rayon fiber having a CSF value of 740 ml, a fineness of 0.5 dtex and a fiber length of 2 mm, 20% by mass of a vinylon fiber having a fineness of 0.5 dtex and a fiber length of 2 mm, and 20% by mass of a PVA binder fiber having a fineness of 1.0 dtex and a fiber length of 3 mm. The substrate was dried to obtain a two-layer separator having a thickness of 74 μm and a density of 0.37 g/cm$^3$. The separator had an MD dimensional change rate of 0.0%, a CD dimensional change rate of 0.0%, an area change rate of 0.0%, wet strength of 18.9 N, a liquid holding amount of 139 g/m$^2$, a Gurley value of 0 min/100 ml, electric resistance of 21.9 mΩ, a curl of 0.4 mm, and wet strength of 9.1 N after 100 hours at 70° C. The fiber layer A of the separator had a thickness of 26 μm and a density of 0.50 g/cm$^3$, and the fiber layer B had a thickness of 48 μm and a density of 0.30 g/cm$^3$.

Conventional Example 2

A coating solution in which a polyvinyl alcohol resin (polymerization degree: 3000, saponification degree 99 mol %) and polyacrylic acid as an additive were dissolved was applied to the fiber layer A side and the fiber layer B side of the same separator substrate as that in Comparative Example 10, and dried to obtain a two-layer separator having a thickness of 50 μm, a density of 0.54 g/cm$^3$, and a content of the fiber layers A and B of 0.4 g/m$^2$. The separator had an MD dimensional change rate of −1.0%, a CD dimensional change rate of 0.7%, an area change rate of −0.3%, wet strength of 10.1 N, a liquid holding amount of 95 g/m$^2$, a Gurley value of 165 min/100 ml, electric resistance of 15.6 mΩ, a curl of 0.3 mm, and wet strength of 2.2 N after 100 hours at 70° C. The fiber layer A of the separator had a thickness of 25 μm and a density of 0.60 g/cm$^3$, and the fiber layer B had a thickness of 25 μm and a density of 0.48 g/cm$^3$.

Conventional Example 3

Cellophane having a thickness of 20 μm and a density of 1.50 g/cm$^3$ was bonded to a separator which had a thickness of 100 μm and a density of 0.25 g/cm$^3$, and was obtained by cylinder papermaking using raw materials obtained by mixing 20% by mass of viscose rayon having a CSF value of 750 ml, a fineness of 0.8 dtex and a fiber length of 3 mm, 70% by mass of a vinylon fiber having a fineness of 0.6 dtex and a fiber length of 2 mm, and 10% by mass of a PVA binder fiber having a fineness of 1.1 dtex and a fiber length of 3 mm, to obtain a two-layer separator having a thickness of 120 μm and a density of 0.46 g/cm$^3$. The separator had an MD dimensional change rate of −0.1%, a CD dimensional change rate of 0.1%, an area change rate of 0.0%, a wet strength of 34.2 N, a liquid holding amount of 138 g/m$^2$, an unmeasurable Gurley value, electric resistance of 30.3 mΩ, a curl of 0.2 mm, and wet strength of 14.0 N after 100 hours at 70° C.

Reference Example 1

A coating solution in which a polyvinyl alcohol resin (polymerization degree: 2500, saponification degree: 99 mol %) was dissolved was applied to the fiber layer A side and the fiber layer B side of the same separator substrate as in that in Comparative Example 10, and dried to obtain a two-layer separator having a thickness of 50 μm, a density of 0.54 g/cm$^3$, and a content of the fiber layers A and B of 0.4 g/m$^2$. The separator had an MD dimensional change rate of −1.0%, a CD dimensional change rate of 0.6%, an area change rate of −0.4%, wet strength of 10.3 N, a liquid holding amount of 92 g/m², a Gurley value of 171 min/100 ml, electric resistance of 21.2 mΩ, a curl of 0.3 mm, and wet strength of 6.0 N after 100 hours at 70° C. The fiber layer A of the separator had a thickness of 25 μm and a density of 0.60 g/cm³, and the fiber layer B had a thickness of 25 μm and a density of 0.48 g/cm³.

Reference Example 2

The fiber layer A described in Example 1 was subjected to fourdrinier papermaking to obtain a separator C having a thickness of 25 μm and a density of 0.62 g/cm³. Similarly, the fiber layer B was subjected to cylinder papermaking to obtain a separator substrate. A coating solution in which a polyvinyl alcohol resin (polymerization degree: 4000, saponification degree 99 mol %) was dissolved was applied to the substrate, and dried to obtain a separator D having a thickness of 35 μm, a density of 0.40 g/cm³, and a resin content of 0.5 g/m². The separator C and the separator D were overlapped on each other to obtain a separator of Reference Example 2. The separator in which the separator C and the separator D were overlapped on each other had an MD dimensional change rate of −0.9%, a CD dimensional change rate of 0.7%, an area change rate of −0.2%, wet strength of 11.8 N, a liquid holding amount of 162 g/m², a Gurley value of 99 min/100 ml, electric resistance of 12.1 mΩ, a curl of 0.0 mm, and wet strength of 6.4 N after 100 hours at 70° C.

Reference Example 3

A fiber layer A and a fiber layer B were integrally stacked by stacking papermaking using the same raw materials as those in Example 3, and dried to obtain a two-layer separator having a thickness of 55 μm and a density of 0.57 g/cm³. No polyvinyl alcohol resin was applied. The separator had an MD dimensional change rate of −0.2%, a CD dimensional change rate of 0.1%, an area change rate of −0.1%, wet strength of 2.8 N, a liquid holding amount of 156 g/m², a Gurley value of 7 min/100 ml, electric resistance of 11.0 mΩ, a curl of 0.2 mm, and wet strength of 2.4 N after 100 hours at 70° C. The fiber layer A of the separator had a thickness of 30 μm and a density of 0.62 g/cm³, and the fiber layer B had a thickness of 25 μm and a density of 0.50 g/cm³.

The material configuration of the separator for alkaline batteries of each of Examples 1 to 5, Comparative Examples 1 to 11, Conventional Examples 1 to 3, and Reference Examples 1 to 3 described above is shown in Table 1. The evaluation results of the separator of each Example and the evaluation results of the alkaline battery prepared by using the separator of each Example are shown in Table 2.

TABLE 1

| | Layer A | | Layer B | | |
| --- | --- | --- | --- | --- | --- |
| | Fibers type | Percentage % by mass | Fibers type | Percentage % by mass | Component g/m² |
| Example 1 | Mercerized pulp, polypropylene (0.8*3) | 90 10 | Mercerized pulp, polypropylene (2.2*5) | 90 10 | 0.5 |
| Example 2 | Mercerized pulp, vinylon (0.6*2) | 60 40 | Mercerized pulp, vinylon (0.6*2) | 60 40 | 1.1 |
| Example 3 | Dissolving pulp, vinylon (0.6*2) | 65 35 | Dissolving pulp, vinylon (0.6*2) | 65 35 | 0.8 |
| Example 4 | Mercerized pulp, vinylon (1.1*3) | 85 15 | Dissolving pulp, vinylon (1.1*3) nylon (2.2*3) | 85 10 5 | 1.5 |
| Example 5 | Dissolving pulp, vinylon (0.6*2) | 80 20 | Mercerized pulp, vinylon (0.6*2) | 70 30 | 0.3 |
| Comparative example 1 | Mercerized pulp. polypropylene (0.8*3) | 90 10 | — | — | — |
| Comparative example 2 | Mercerized pulp, polypropylene (0.8*3) | 95 5 | Mercerized pulp, polypropylene (2.2*5) | 95 5 | 0.5 |
| Comparative example 3 | Mercerized pulp, vinylon (0.6*2) | 55 45 | Mercerized pulp, vinylon (0.6*2) | 55 45 | 0.9 |
| Comparative example 4 | Mercerized pulp, polypropylene (0.8*3) | 90 10 | Mercerized pulp, polypropylene (2.2*5) | 90 10 | 1 2 |
| Comparative example 5 | Mercerized pulp, vinylon (0.6*2) | 60 40 | Mercerized pulp, vinylon (0.6*2) | 60 40 | 0.2 |
| Comparative example 6 | Mercerized pulp, vinylon (0.6*2) | 60 40 | Mercerized pulp, vinylon (0.6*2) | 60 40 | — |
| Comparative example 7 | Mercerized pulp, polypropylene (0.8*3) | 90 10 | Mercerized pulp, polypropylene (1.1*3) | 90 10 | 0.8 |
| Comparative example 8 | Mercerized pulp, vinylon (0.6*2) | 60 40 | Mercerized pulp, vinylon (0.6*2) | 60 40 | 0.4 |
| Comparative example 9 | Mercerized pulp, vinylon (1.1*3), | 80 20 | Dissolving pulp, vinylon (1.1*3) nylon (2,2*3) | 70 25 | 1.8 |
| Comparative example 10 | Mercerized pulp, vinylon (0.6*2) | 90 10 | Mercerized pulp, vinylon (0.6*2) | 90 10 | — |
| Comparative example 11 | Mercerized pulp vinylon (0.6*2) PVA binder (1.1*3) | 60 30 10 | Mercerized pulp, vinylon (0.6*2) PVA binder (1.1*3) | 60 30 10 | — |
| Conventional example 1 | Mercerized pulp, vinylon (0.5*2), PVA binder (1.0*3) | 60 20 20 | Polynosic rayon (0.5*2), vinylon (0.5*2), PVA binder (1.0*3) | 60 20 20 | — |
| Conventional example 2 | Mercerized pulp, vinylon (0.6*2) | 90 10 | Mercerized pulp, vinylon (0.6*2) | 90 10 | 0.4 |
| Conventional example 3 | Cellophane | — | Viscose rayon (0.8*3), Vinylon (0.6*2), | 20 70 | — |

TABLE 1-continued

|  | Layer A | | Layer B | | |
| --- | --- | --- | --- | --- | --- |
|  | Fibers type | Percentage % by mass | Fibers type | Percentage % by mass | Component g/m$^2$ |
|  |  |  | PVA binder (1.1*3) | 10 |  |
| Reference example 1 | Mercerized pulp, vinylon (0.6*2) | 90 10 | Mercerized pulp, vinylon (0.6*2) | 90 10 | 0.4 |
| Reference example 2 | Mercerized pulp, polypropylene (0.8*3) | 90 10 | Mercerized pulp, polypropylene (2.2*5) | 90 10 | 0.5 |
| Reference example 3 | Dissolving pulp, vinylon (0.6*2) | 65 35 | Dissolving pulp, vinylon (0.6*2) | 65 35 | — |

(Fineness*fiber length) was described in parenthesis after alkali-resistant synthetic fiber.

TABLE 2

| | Layer A | | Layer B | | Two layers | | MD dimensional change rate % | CD dimensional change rate % | Area change rate % | Wet strength N | Liquid holding amount g/cm² | Gurley value Min/100 ml | Electrical resistance mΩ | Curl mm | Wet strength at 70° C. for 100 h N | Battery Test | | | |
|---|---|---|---|---|---|---|---|---|---|---|---|---|---|---|---|---|---|---|---|
| | Thickness μm | Density g/cm³ | Thickness μm | Density g/cm³ | Thickness μm | Density g/cm³ | | | | | | | | | | 2 Ω discharge time Min. | 100 Ω discharge time Hour | Intermittent discharge % | Short circuit rate after high temperature load % |
| Example 1 | 25 | 0.62 | 35 | 0.40 | 60 | 0.49 | −1.0 | 0.7 | 0.3 | 12.2 | 162 | 103 | 11.5 | 0.5 | 6.9 | 161 | 280 | 0 | 0 |
| Example 2 | 25 | 0.52 | 25 | 0.50 | 50 | 0.51 | −0.1 | 0.0 | −0.1 | 18.1 | 94 | 6 | 13.4 | 0.0 | 8.5 | 147 | 242 | 0 | 0 |
| Example 3 | 30 | 0.62 | 25 | 0.50 | 55 | 0.57 | −0.2 | 0.1 | −0.1 | 16.5 | 103 | 39 | 14.4 | 0.3 | 7.6 | 140 | 249 | 0 | 0 |
| Example 4 | 35 | 0.55 | 35 | 0.48 | 70 | 0.52 | −0.5 | 0.3 | −0.2 | 22.7 | 133 | 80 | 16.4 | 0.1 | 10.6 | 124 | 260 | 0 | 0 |
| Example 5 | 25 | 0.52 | 35 | 0.40 | 60 | 0.45 | −0.2 | 0.2 | 0.0 | 10.5 | 157 | 9 | 11.8 | 0.2 | 5.2 | 159 | 277 | 0 | 0 |
| Comparative Example 1 | 60 | 0.62 | — | — | 60 | 0.45 | −1.0 | 0.8 | −0.2 | 10.1 | 70 | 201 | 24.6 | 0.0 | 5.3 | 106 | 216 | 0 | 0 |
| Comparative Example 2 | 25 | 0.62 | 35 | 0.38 | 60 | 0.48 | −1.3 | 1.1 | −0.2 | 12.1 | 158 | 106 | 11.4 | 0.6 | 6.6 | — | — | — | — |
| Comparative Example 3 | 30 | 0.52 | 30 | 0.45 | 60 | 0.49 | 0.0 | 0.0 | 0.0 | 15.8 | 70 | 3 | 15.1 | 0.1 | 8.1 | 133 | 215 | 9 | 0 |
| Comparative Example 4 | 25 | 0.51 | 37 | 0.40 | 62 | 0.44 | −0.8 | 0.7 | −0.1 | 17.4 | 149 | 1 | 14.0 | 0.2 | 8.3 | 142 | 272 | 19 | 0 |
| Comparative Example 5 | 32 | 0.52 | 23 | 0.48 | 55 | 0.50 | −0.1 | 0.0 | −0.1 | 6.9 | 80 | 0 | 11.6 | 0.1 | 4.1 | — | — | — | — |
| Comparative Example 6 | — | — | — | — | — | — | — | — | — | — | — | — | — | — | — | — | — | — | — |
| Comparative Example 7 | 39 | 0.69 | 25 | 0.40 | 64 | 0.58 | −0.9 | 0.5 | −0.4 | 15.2 | 159 | 144 | 20.1 | 0.7 | 7.9 | 113 | 278 | 0 | 0 |
| Comparative Example 8 | 35 | 0.52 | 30 | 0.52 | 65 | 0.52 | −0.1 | 0.1 | 0.0 | 10.9 | 81 | 21 | 12.7 | 0.0 | 6.1 | 151 | 234 | 0 | 0 |
| Comparative Example 9 | 23 | 0.62 | 26 | 0.50 | 49 | 0.56 | −0.2 | 0.1 | −0.1 | 23.6 | 63 | 4 | 20.2 | 0.2 | 11.8 | 118 | 209 | 3 | 0 |
| Comparative Example 10 | 25 | 0.62 | 25 | 0.45 | 50 | 0.54 | −1.0 | 0.6 | −0.4 | 9.2 | 92 | 198 | 23.4 | 0.5 | 5.1 | 107 | 241 | 0 | 0 |
| Comparative Example 11 | 30 | 0.55 | 35 | 0.48 | 65 | 0.51 | −0.1 | 0.0 | −0.1 | 15.6 | 87 | 22 | 22.6 | 0.1 | 8.0 | 108 | 237 | 0 | 0 |
| Conventional Example 1 | 26 | 0.50 | 48 | 0.30 | 74 | 0.37 | 0.0 | 0.0 | 0.0 | 18.9 | 139 | 0 | 21.9 | 0.4 | 9.1 | 109 | 267 | 88 | 0 |
| Conventional Example 2 | 25 | 0.60 | 25 | 0.48 | 50 | 0.54 | −1.0 | 0.7 | −0.3 | 10.1 | 95 | 165 | 15.6 | 0.3 | 2.2 | 130 | 245 | 0 | 2 |
| Conventional Example 3 | 20 | 1.50 | 100 | 0.25 | 120 | 0.46 | −0.1 | 0.1 | 0.0 | 34.2 | 138 | Unmeasureable | 30.3 | 0.2 | 14.0 | 101 | 266 | 0 | 0 |
| Reference Example 1 | 25 | 0.60 | 25 | 0.48 | 50 | 0.54 | −1.0 | 0.6 | −0.4 | 10.3 | 92 | 171 | 21.2 | 0.3 | 6.0 | 111 | 241 | 0 | 0 |
| Reference Example 2 | 25 | 0.62 | 35 | 0.40 | 60 | 0.49 | −0.9 | 0.7 | −0.2 | 11.8 | 162 | 99 | 12.1 | 0.0 | 6.4 | — | — | — | — |
| Reference Example 3 | 30 | 0.62 | 25 | 0.50 | 55 | 0.57 | −0.2 | 0.1 | −0.1 | 2.8 | 156 | 7 | 11.0 | 0.2 | 2.4 | — | — | — | — |

As shown in Table 2, the entirety of the separator of each Example has a density of 0.45 to 0.57 g/cm$^3$, and a thickness of 50 to 70 μm. The separator can be achieved, which has a smaller thickness, more excellent shielding properties and liquid holding properties, and better strength and dimensional stability in the electrolyte solution than those of conventionally used separators (Conventional Examples 1 to 3).

The separators of Examples 3 to 5 are separators in which both the fiber layer A and the fiber layer B have a content of the alkali-resistant cellulose fiber of 65% by mass to 85% by mass. It can be seen that the separators have more excellent dimensional stability, shielding properties, and liquid holding properties than those of the separators of Examples 1 and 2.

The alkaline battery of each Example has a higher discharge time at each resistance than that in Conventional Examples, and causes no short circuit failure even after intermittent discharge and high temperature load.

The separator of Comparative Example 1 includes only the fiber layer A of the separator of Example 1. Therefore, the separator of Comparative Example 1 has a denser configuration than that of each Example. That is, the number of voids of the separator is smaller than that of each Example. Therefore, the separator of Comparative Example 1 has higher electrical resistance and a smaller liquid holding amount than those of each Example.

The load discharge times of the alkaline battery using the separator of Comparative Example 1 at 2Ω and 100Ω were shorter than those in each Example. This is considered to be because the separator of Comparative Example 1 is denser than that of each Example as described above, whereby the separator has high electrical resistance of more than 20 mΩ and a liquid holding amount of less than 90 g/m$^2$.

Comparison between Comparative Example 1 and each Example shows that the separator preferably includes the fiber layer B having excellent liquid holding properties.

In the separator of Comparative Example 2, the content of the mercerized pulp which was alkali-resistant cellulose contained in the fiber layer A and the fiber layer B was as large as 95% by mass. In the alkaline battery using the separator of Comparative Example 2, a short circuit occurred, whereby the battery could not be evaluated. This is considered to be because the content of the alkali-resistant cellulose fiber is as large as more than 90% by mass, and the content of the alkali-resistant synthetic fiber is less than 10% by mass, whereby the dimensional change of the separator is −1.0% or less.

In the separator of Comparative Example 2, the density of the fiber layer A is 0.62 g/cm$^3$, and the density of the fiber layer B is 0.38 g/cm$^3$. The separator of Comparative Example 2 was curled during the manufacturing process of the battery. This is considered to be because a difference in density between the fiber layer A and the fiber layer B is large, and a difference in dimensional change between the layers occurs due to a difference in moisture absorption rate between the fiber layer A and the fiber layer B when the separator was fed during the manufacture of the battery.

Comparison between Comparative Example 2 and each Example shows that the content of the alkali-resistant cellulose fiber contained in the fiber layer A and the fiber layer B is preferably 90% by mass or less, and the content of the alkali-resistant synthetic fiber is preferably 10% by mass or more. It can be seen that the density of the fiber layer B is preferably 0.40 g/cm$^3$ or more.

In the separator of Comparative Example 3, the content of the mercerized pulp which is the alkali-resistant cellulose contained in the fiber layer A and the fiber layer B is as low as 55% by mass, and the content of the vinylon fiber which is the alkali-resistant synthetic fiber is as high as 45% by mass. For this reason, although the CSF value and fiber length of the alkali-resistant cellulose contained in the fiber layer A and the fiber layer B were within the ranges of each Example, the 100Ω discharge time was shorter than that of each Example, and 9% failure occurred during the intermittent discharge test. This is considered to be because the content of the alkali-resistant cellulose fiber is as low as less than 60% by mass, and in addition, 45% by mass of the vinylon fiber is contained in Comparative Example 3, whereby the effect of containing the alkali-resistant cellulose fiber is not sufficiently obtained.

Comparison between Comparative Example 3 and each Example shows that the content of the alkali-resistant cellulose fiber contained in the fiber layer A and the fiber layer B is preferably 60% by mass or more, and the content of the alkali-resistant synthetic fiber is preferably 40% by mass or less.

That is, Comparative Examples 2 and 3 and each Example show that the content of the alkali-resistant cellulose fiber contained in the fiber layer A and the fiber layer B is preferably in the range of 60 to 90% by mass, and the content of the alkali-resistant synthetic fiber is preferably in the range of 10 to 40% by mass.

In the separator of Comparative Example 4, a beating raw material in which the CSF value of the alkali-resistant cellulose fiber of the fiber layer A is 180 ml and the fiber length is 0.9 mm is used. In the alkaline battery using the separator of Comparative Example 4, 19% failure occurred in the intermittent discharge test. This is considered to be because the degree of beating of the alkali-resistant cellulose fiber of the fiber layer A is low, and the Gurley value is 1 min/100 ml, whereby the shielding properties of the separator are insufficient. This is considered to be because the CSF value is 180 ml, which is 200 ml or less, but the fiber length is 0.9 mm, which is more than 0.8 mm, whereby the density of the fiber layer A is 0.51 g/cm$^3$, which is less than 0.52 g/cm$^3$, which causes larger voids.

The thickness of the fiber layer B of Comparative Example 4 is as large as 37 μm, and the electrical resistance is higher than that of each Example. Therefore, in the 2Ω discharge test, the discharge time was shorter than that in each Example.

Comparison between Comparative Example 4 and each Example shows that the fiber length of the alkali-resistant cellulose fiber contained in the fiber layer A is preferably 0.8 mm or less, and the density is preferably 0.52 g/cm$^3$ or more. It can be seen that the thickness of the fiber layer B is preferably 35 μm or less.

In the separator of Comparative Example 5, the content of the polyvinyl alcohol resin contained in the fiber layer B is as small as 0.2 g/m$^2$, and the wet strength is weaker than that of Conventional Example. Therefore, a short circuit occurred during the manufacture of the battery, which could not provide the battery.

In the separator of Comparative Example 5, the thickness of the fiber layer B is 23 μm, which is smaller than that of each Example. Therefore, the liquid holding amount was smaller than that in each Example. Accordingly, even if the battery is evaluated, the 100Ω discharge test result can be estimated to be poorer than that of each Example.

Furthermore, in the separator of Comparative Example 5, a beating raw material in which the CSF value of the alkali-resistant cellulose fiber of the fiber layer A is 250 ml and the fiber length is 1.0 mm is used. Therefore, the Gurley value was 0 min/100 ml, which was less than 5 min/100 ml. Accordingly, even if the battery can be evaluated, failure can be estimated to occur in the intermittent discharge test. This is considered to be because the CSF value is 250 ml, which is more than 200 ml, and the fiber length is 1.0 mm, which is more than 0.8 mm, whereby the degree of beating of the alkali-resistant cellulose fiber of the fiber layer A is low, which causes insufficient shielding properties of the separator.

Comparison between Comparative Example 5 and each Example shows that the CSF value of the alkali-resistant cellulose fiber contained in the fiber layer A is preferably 200 ml or less, and the fiber length is preferably 0.8 mm or less. It can be seen that the content of the polyvinyl alcohol resin of the fiber layer B is preferably 0.3 g/m² or more, and the thickness of the fiber layer B is preferably 25 μm or more.

That is, comparison between Comparative Examples 4 and 5 and each Example shows that the thickness of the fiber layer B is preferably in the range of 25 to 35 μm.

In the separator of Comparative Example 6, a beating raw material in which the CSF value of the alkali-resistant cellulose fiber of the fiber layer A is 400 ml and the fiber length is 0.2 mm is used. Since the CSF value of the alkali-resistant cellulose fiber of the fiber layer A of Comparative Example 6 was 400 ml, which was more than 200 ml, and the fiber length was 0.2 mm, which was less than 0.4 mm, the strength of the wet paper web was weak during papermaking, whereby the separator could not be stably manufactured.

Comparison between Comparative Example 6 and each Example shows that the CSF value of the alkali-resistant cellulose fiber contained in the fiber layer A is preferably 200 ml or less and the fiber length is preferably 0.4 mm or more.

That is, comparison between Comparative Examples 4 to 6 and each Example shows that the CSF value of the alkali-resistant cellulose fiber contained in the fiber layer A is preferably in the range of 200 to 0 ml and the fiber length is preferably in the range of 0.4 to 0.8 mm.

In the separator of Comparative Example 7, the CSF value of the mercerized pulp which is alkali-resistant cellulose contained in the fiber layer B is 740 ml, which is more than 700 ml, and the fiber length is 1.9 mm, which is more than 1.8 mm, whereby the degree of beating is low. For this reason, fuzz was observed during the manufacture of the alkaline battery. This is considered to be because the degree of beating of alkali-resistant cellulose is low, which causes a weak inter-fiber bond.

In the separator of Comparative Example 7, the thickness of the fiber layer A is as large as 39 μm. The 2Ω discharge time of the alkaline battery using this separator was shorter than that in each Example. This is considered to be because the thickness of the fiber layer A is more than that in each Example, which causes increased electric resistance of the separator.

In addition, in the separator of Comparative Example 7, the density of the fiber layer A is 0.69 g/cm³, and the density of the fiber layer B is 0.40 g/cm³. The separator of Comparative Example 7 was curled during the manufacturing process of the battery. This is considered to be because the difference in density between the fiber layer A and the fiber layer B is large as with the separator of Comparative Example 2, whereby the separator is curled.

Comparison between Comparative Example 7 and each Example shows that the CSF value of the alkali-resistant cellulose contained in the fiber layer B is preferably 700 ml or less, and the fiber length is preferably 1.8 mm or less. It can be seen that the thickness of the fiber layer A is preferably 35 μm or less, and the density is preferably 0.62 g/cm³ or less.

That is, comparison between Comparative Examples 4 and 7 and each Example shows that the density of the fiber layer A is preferably in the range of 0.52 to 0.62 g/cm³.

In the separator of Comparative Example 8, the CSF value of the alkali-resistant cellulose fiber contained in the fiber layer B is 480 ml and the fiber length is 1.1 mm, whereby the degree of beating is higher than that in each Example. Therefore, the liquid holding amount was smaller than that in each Example, and the 100Ω discharge time was shorter than that in each Example. This is considered to be because the degree of beating of the alkali-resistant cellulose is high, whereby the density of the fiber layer B is as high as 0.52 g/cm³, which is more than 0.50 g/cm³, and the number of voids that can hold liquid in the fiber layer B is reduced.

Comparison between Comparative Example 8 and each Example shows that the CSF value of the alkali-resistant cellulose fiber contained in the fiber layer B is preferably 500 ml or more; the fiber length is preferably 1.2 mm or more; and the density is preferably 0.50 g/cm³ or less.

That is, comparison between Comparative Examples 2 and 8 and each Example shows that the density of the fiber layer B is preferably in the range of 0.40 to 0.50 g/cm³.

Comparison between Comparative Examples 7 and 8 and each Example shows that the CSF value of the alkali-resistant cellulose contained in the fiber layer B is preferably in the range of 700 to 500 ml and the fiber length is preferably in the range of 1.2 to 1.8 mm.

In the separator of Comparative Example 9, the content of the polyvinyl alcohol resin contained in the fiber layer B is 1.8 g/m², which is more than that in each Example. The 2Ω and 100Ω discharge times of the alkaline battery using this separator were shorter than those in each Example. This is considered to be because the content of the polyvinyl alcohol resin is as large as more than 1.5 g/m², and even in the separator of the present invention, voids between fibers are clogged, whereby the electrical resistance is significantly increased and the liquid holding amount is decreased.

The thickness of the fiber layer A is 23 μm, which is less than that of each Example. Therefore, even when the content of the alkali-resistant cellulose fiber contained in the fiber layer A and the CSF value were within claims of the present application, failure occurred in the intermittent discharge test. This shows that, even if a highly beaten alkali-resistant cellulose fiber is contained in a sufficient amount, the Gurley value is 4 min/100 ml, which is lower than that in each Example when the thickness of the fiber layer A is less than 25 μm, whereby the shielding properties are insufficient.

Comparison between Comparative Example 9 and each Example shows that the content of the polyvinyl alcohol resin in the fiber layer B is preferably 1.5 g/m² or less, and the thickness of the fiber layer A is preferably 25 μm or more.

That is, comparison between Comparative Examples 5 and 9 and each Example shows that the content of the polyvinyl alcohol resin contained in the fiber layer B is preferably in the range of 0.3 to 1.5 g/m².

Comparison between Comparative Examples 7 and 9 and each Example shows that the thickness of the fiber layer A is preferably in the range of 25 to 35 μm.

The separator of Comparative Example 10 is a separator in which the polyvinyl alcohol resin is applied to the fiber layer A side. In the alkaline battery using this separator, the 2Ω discharge time is shorter than that in each Example. This is considered to be because voids in the entirety of the fine fiber surface are filled with the polyvinyl alcohol resin due to the effect of applying the polyvinyl alcohol resin to the dense fiber layer A, whereby ion permeation is inhibited, which causes an increased resistance value.

Comparison between Comparative Example 10 and each Example shows that the polyvinyl alcohol resin is not preferably applied to the fiber layer A, and the polyvinyl alcohol resin is preferably applied only to the fiber layer B.

The separator of Comparative Example 11 is a separator containing the PVA binder fiber on both the fiber layer A side and the fiber layer B side. In the alkaline battery using this separator, both the 2Ω discharge time and the 100Ω discharge time are shorter than those in each Example. This is considered to be because the dense fiber layer A contains 10% by mass of the PVA binder fiber, that is, the amount of the PVA binder contained in the fiber layer A is 1.7 g/m$^2$, whereby voids between fibers are clogged by the PVA binder, and the electrical resistance of the separator is 22.6 mΩ, which is more than 20.0 mΩ. Since the fiber layer B having liquid holding properties also contains 10% by mass of the PVA binder fiber, that is, the amount of the PVA binder contained in the fiber layer B is 1.6 g/m$^2$, which is more than that in each Example, this is considered to be because voids between the fibers are similarly clogged by the PVA binder, which causes a decreased space capable of holding liquid so that the liquid holding amount is 87 g/m$^2$, which is less than 90 g/m$^2$.

Meanwhile, if the amount of the PVA binder fiber in each layer is less than 10% by mass, the strength of the separator in the electrolyte solution is considered to be insufficient, which causes short circuit failure.

In the separator of Conventional Example 1, a beating raw material in which the CSF value of the alkali-resistant cellulose fiber for the fiber layer A is 290 ml and the fiber length is 1.2 mm is used, and a beating raw material in which the CSF value of the alkali-resistant cellulose fiber for the fiber layer B is 740 ml and the fiber length is 2.0 mm is used. In the alkaline battery using the separator of Conventional Example 1, 88% failure occurred in the intermittent discharge test. As with Comparative Example 5, this is considered to be because the alkali-resistant cellulose fiber having a CSF value of 200 ml or less and a fiber length of 0.8 mm or less in the fiber layer A is not used, whereby the shielding properties of the separator are insufficient.

The separator of Conventional Example 1 contains a PVA binder fiber. Therefore, the 2Ω discharge time was shorter than that in each Example. This is considered to be because the electrical resistance of the separator is high for the same reason as in Comparative Example 11.

The separator of Conventional Example 2 is a separator in which the polyvinyl alcohol resin is also applied to the fiber layer B of the separator of Comparative Example 10, and polyacrylic acid is further added as an additive into the coating solution applied to both the fiber layer A side and the fiber layer B side to cause the polyvinyl alcohol resin to contain polyacrylic acid. In this separator, the polyvinyl alcohol resin contains polyacrylic acid, whereby the separator contains the electrolyte solution satisfactorily held in the resin, and swells, whereby an increase in the resistance value of the separator can be suppressed. In the alkaline battery using this separator, a short circuit occurred in a drop test after being left at 70° C. for 500 hours. This is considered to be because the addition of polyacrylic acid causes polyacrylic acid contained in the polyvinyl alcohol resin exhibiting strength to swell, whereby a binding part between the fibers is locally weakened, leading to deterioration in impact resistance.

The separator of Conventional Example 3 is a separator obtained by bonding cellophane having excellent shielding properties and a nonwoven fabric having excellent liquid holding properties to each other. Since the separator of Conventional Example 3 has cellophane, the separator has very excellent shielding properties, but the separator has poor ion permeability, and higher electrical resistance than that of each Example. Therefore, the 2Ω discharge time is shorter than that in each example.

The separator of Reference Example 1 is a separator in which the polyvinyl alcohol resin is also applied to the fiber layer B side of the separator of Comparative Example 10. In the alkaline battery using this separator, the 2Ω discharge time and the 100Ω discharge time are shorter than those in each Example. This is considered to be because, as with Comparative Example 10, voids in the entirety of the fine fiber surface are filled with the polyvinyl alcohol resin due to the effect of applying the polyvinyl alcohol resin to the dense fiber layer A, whereby ion permeation is inhibited, which causes an increased resistance value. In the separator of Reference Example 1, this is considered to be because the polyvinyl alcohol resin is also applied to the fiber layer B, whereby the number of voids in the fiber layer B is also reduced as compared with Comparative Example 10, and the liquid holding amount is reduced.

In the separator of Reference Example 2, the fiber layer A and the fiber layer B were overlapped on each other during the manufacture of the battery, to form a cylinder. The obtained battery caused a short circuit, and could not be evaluated. This is because the polyvinyl alcohol resin is applied to the fiber layer B, whereby the fiber layer B has excellent strength in the electrolyte solution, but the polyvinyl alcohol resin is not applied to the fiber layer A, whereby the fiber layer A has weak wet strength. Therefore, a short circuit occurred during the manufacture of the battery, which could not provide the battery.

That is, it can be seen that the coating of the polyvinyl alcohol resin only on the fiber layer B side in the integrally stacked state of the present invention also leads to improvement in the strength of the entirety of the separator in the electrolyte solution.

The separator of Reference Example 3 is a separator in which the polyvinyl alcohol resin is not applied to the separator of Example 3. Since the polyvinyl alcohol resin was not applied, the wet strength was 2.8 N, which was weaker than that of each Example, and a short circuit occurred during the manufacture of the battery, whereby the battery could not be evaluated.

Comparison between Example 3 and Reference Example 3 shows that by applying the polyvinyl alcohol resin, wet strength equal to or higher than that of Conventional Example can be imparted. It can be seen that in the separator of Example 3, significant deteriorations in electric resistance and a liquid holding amount are not observed even when the polyvinyl alcohol resin is applied. This is considered to be because, unlike the conventional separator, when the coating solution is dried, the coating solution is not dried in a state where a film is formed in a void part between the fibers, and the polyvinyl alcohol resin is fixed to each fiber so as to cover the fiber.

That is, it can be seen that according to the present invention, even when the amount of the polyvinyl alcohol resin applied is smaller than that in the conventional technique, the separator has wet strength that can withstand a battery manufacture line and can suppress the clogging of the voids between the fibers, whereby the electric resistance and the liquid holding amount are not significantly deteriorated.

As described above, the present invention can provide a separator for alkaline batteries, which exhibits excellent strength, dimensional stability and chemical stability in an electrolyte solution, while having high shielding properties, high liquid holding properties and low resistance. The use of the separator makes it possible to provide an alkaline battery having a high capacity, a large current discharge, and a long life.

REFERENCE SIGNS LIST 1 alkaline manganese battery
2 positive electrode can
2a positive electrode terminal
3 positive electrode mixture
4 separator
5 gelatinous negative electrode
6 negative electrode current collector
7 resin sealed unit
8 negative electrode terminal plate
9 resin exterior material
101 light source
102 light
103 test piece of separator
104 curled separator
Y projected paper width

The invention claimed is:

1. A separator for alkaline batteries, which is used for the purpose of separating a positive electrode active material and a negative electrode active material from each other, and holding an electrolyte solution, and which is obtained by integrally stacking
   a fiber layer A that has a density of 0.52 to 0.62 g/cm$^3$ and a thickness of 25 to 35 μm and
   a fiber layer B that has a density of 0.40 to 0.50 g/cm$^3$ and a thickness of 25 to 35 μm,
   so that the entirety of the separator has a density of 0.45 to 0.57 g/cm$^3$ and a thickness of 50 to 70 μm, wherein
   the fiber layer A and the fiber layer B contain 60 to 90% by mass of an alkali-resistant cellulose fiber and 10 to 40% by mass of an alkali-resistant synthetic fiber,
   the alkali-resistant cellulose fiber is a dissolving pulp or a mercerized pulp,
   the alkali-resistant synthetic fiber is a vinylon fiber obtained by acetalizing hydroxyl groups of a polyvinyl alcohol fiber,
   the fiber layer A does not contain a polyvinyl alcohol resin, and
   the fiber layer B contains a polyvinyl alcohol resin in an amount of 0.3 to 1.5 g/m$^2$.

2. The separator for alkaline batteries according to claim 1, wherein the fiber layer A contains an alkali-resistant cellulose fiber having a CSF value of 200 to 0 ml, and the fiber layer B contains an alkali-resistant cellulose fiber having a CSF value of 700 to 500 ml.

3. An alkaline battery in which a positive electrode active material and a negative electrode active material are separated from each other by a separator, wherein
   the separator for alkaline batteries according to claim 1 is used as the separator.

4. The alkaline battery according to claim 3, wherein the alkaline battery has an AA shape or an AAA shape.

5. The alkaline battery according to claim 3, wherein the alkaline battery is any one of an alkaline manganese battery, a nickel zinc battery, a silver oxide battery, and an air-zinc battery.

* * * * *